(12) United States Patent
Goto

(10) Patent No.: US 11,772,597 B2
(45) Date of Patent: Oct. 3, 2023

(54) DRONE WITH AIRBAG

(71) Applicant: MATSUYA R&D CO., LTD., Ono (JP)

(72) Inventor: Hidetaka Goto, Fukui (JP)

(73) Assignee: MATSUYA R&D CO., LTD., Fukui (JP)

( * ) Notice: Subject to any disclaimer, the term of this patent is extended or adjusted under 35 U.S.C. 154(b) by 1103 days.

(21) Appl. No.: 16/339,816

(22) PCT Filed: Oct. 31, 2017

(86) PCT No.: PCT/JP2017/039219
§ 371 (c)(1),
(2) Date: Apr. 5, 2019

(87) PCT Pub. No.: WO2018/084125
PCT Pub. Date: May 11, 2018

(65) Prior Publication Data
US 2020/0039466 A1    Feb. 6, 2020

(30) Foreign Application Priority Data

Nov. 4, 2016  (JP) .................................. 2016-216367
Apr. 3, 2017  (JP) .................................. 2017-073725

(51) Int. Cl.
*B60R 21/36* (2011.01)
*B60R 21/237* (2006.01)
(Continued)

(52) U.S. Cl.
CPC ............. *B60R 21/36* (2013.01); *B60R 21/237* (2013.01); *B64C 27/08* (2013.01); *B64C 39/024* (2013.01); *B64D 25/00* (2013.01); *B64D 45/00* (2013.01)

(58) Field of Classification Search
CPC ... B64C 39/024; B64C 2201/00; B64D 25/00; B64D 45/00; B64D 2201/00
See application file for complete search history.

(56) References Cited

U.S. PATENT DOCUMENTS 9,611,045 B2 * 4/2017 Erickson ............... B64C 39/024
9,613,539 B1 * 4/2017 Lindskog ............. G08G 5/0056
(Continued)

FOREIGN PATENT DOCUMENTS

CN    205396561 U    7/2016
CN    106029499 A   10/2016
(Continued)

OTHER PUBLICATIONS

Taiwanese OA dated Jun. 12, 2019 in corresponding Patent Appln. No. 106138158.
(Continued)

*Primary Examiner* — Benjamin P Lee
(74) *Attorney, Agent, or Firm* — BACON&THOMAS,PLLC

(57) ABSTRACT

Provided is a drone with an airbag with which it is possible to prevent the danger of injuring a person when a crashed drone collides with the person. A first airbag 11 is provided in a state surrounding a drone 9 within the horizontal plane. The first airbag 11 is held by a first holding part 10 provided on a central mounting part 2. The first airbag 11 is installed in the first holding part 10 in a folded state, the first airbag 11 being inflatable so as to project outward by gas being supplied. The first airbag 11 is capable of expanding before impacting another object such as a person and surrounding the drone 9 in the horizontal plane.

5 Claims, 23 Drawing Sheets

(51) Int. Cl.
    *B64C 27/08*     (2023.01)
    *B64C 39/02*     (2023.01)
    *B64D 25/00*     (2006.01)
    *B64D 45/00*     (2006.01)

(56) References Cited

U.S. PATENT DOCUMENTS

| | | | | |
|---|---|---|---|---|
| 9,834,311 | B2 * | 12/2017 | Sugaya | B64C 39/024 |
| 9,908,629 | B2 * | 3/2018 | Erickson | B64D 17/80 |
| D867,207 | S * | 11/2019 | O'Brien | D12/16.1 |
| 11,046,443 | B2 * | 6/2021 | Tanriover | B64D 25/00 |
| 2016/0144958 | A1 | 5/2016 | Woodworth et al. | |
| 2016/0167793 | A1 * | 6/2016 | Geneste | B64G 1/62 |
| | | | | 244/121 |
| 2016/0272333 | A1 | 9/2016 | Heinonen | |
| 2016/0332739 | A1 * | 11/2016 | Wong | B64C 39/024 |
| 2016/0368610 | A1 * | 12/2016 | Erickson | B64C 39/024 |
| 2018/0022310 | A1 * | 1/2018 | Olson | B64D 25/00 |
| | | | | 244/100 A |
| 2019/0039743 | A1 * | 2/2019 | Tanriover | E05F 1/00 |
| 2019/0382120 | A1 * | 12/2019 | Nakamura | B64D 45/04 |
| 2020/0039466 | A1 * | 2/2020 | Goto | B60R 21/36 |
| 2020/0216181 | A1 * | 7/2020 | Yagihashi | B64D 17/80 |
| 2020/0231291 | A1 * | 7/2020 | Wakatsuki | B64D 47/08 |
| 2020/0239136 | A1 * | 7/2020 | Nakamura | B64C 39/024 |
| 2020/0339278 | A1 * | 10/2020 | Nakamura | B64D 17/80 |
| 2021/0053691 | A1 * | 2/2021 | Goto | B64D 25/00 |

FOREIGN PATENT DOCUMENTS

| | | | | |
|---|---|---|---|---|
| CN | 108025815 A | | 5/2018 | |
| JP | 5857326 B1 | | 2/2016 | |
| JP | 5875093 B1 | | 3/2016 | |
| JP | 2016-518286 A | | 6/2016 | |
| JP | 2016-165987 A | | 9/2016 | |
| JP | 2016-165987 A | | 9/2016 | |
| JP | 2019127074 A | * | 8/2019 | B64C 39/024 |
| KR | 20120084433 A | | 7/2012 | |
| KR | 101558178 B1 | | 10/2015 | |
| WO | WO2016-204803 A1 | | 12/2016 | |

OTHER PUBLICATIONS

First Office Action cited in the corresponding Chinese Patent Appl. No. 201780057843.7 which dated Sep. 26, 2021.
Extended European Search Report dated May 26, 2020 in corresponding European Patent Appln. No. 17868210.0.

* cited by examiner

DRONE WITH AIRBAG

TECHNICAL FIELD

The present invention relates to a drone with an airbag. More particularly, the present invention relates to a drone with an airbag in which the airbag can be inflated before the drone collides with the other things such as a person or an initially inflated airbag is provided, in such a manner as to effectively prevent such a danger that the drone injures the person in the case that the drone collides with the other things such as the person or a building structure, when the drone during the flight becomes an uncontrollable state under the influence of a trouble in an air frame, an abnormal weather or a radio disturbance and is crashed.

BACKGROUND ART

In the drone in which an arm part is protruded from a central mounting part accommodating a camera therein, and a rotary vane is provided at a front side position of the arm part, the drone may be crashed by the trouble of the air frame such as a breakage of a motor rotating the rotary vane and a deterioration of a battery, or may be crashed under the influence of the abnormal weather such as blast, and may be further crushed by the radio disturbance in the case that the drone is affected by any noise or flies to an area where the radio wave does not reach, that is, the drone may be crashed due to various causes (patent literature 1 and patent literature 2).

When the drone is crashed as mentioned above, there has been such a danger that the crashed drone injures the person in the case that the crashed drone collides with the other things such as the person or the building structure.

CITATION LIST

Patent Literature

Patent Literature 1: Japanese Patent No. 5857326
Patent Literature 2: Japanese Patent No. 5875093

SUMMARY OF INVENTION

Technical Problem

The present invention is developed by taking into consideration the conventional problems mentioned above, and an object of the present invention is to provide a drone with an airbag which can effectively prevent such the danger that the drone during the flight is crashed due to the unexpected occurrence such as the trouble in the air fame, the abnormal weather and the radio wave, and the crashed drone collides with the other things such as the person or the building structure and injures the person.

Solution to Problem

In order to achieve the object mentioned above, the present invention employs the following means.

More specifically, in a first aspect of the drone with the airbag according to the present invention, the drone provided with a rotary vane generating a lift force is provided with the airbag which absorbs a shock generated when the drone is crashed and collides with the other things, and is provided with an inflation control device which controls inflation of the airbag, the airbag can inflate by the gas supplied on the basis of a control by the inflation control device, and the inflation is carried out by the control before the drone collides with the other things. The airbag includes a second airbag which absorbs the shock generated when the drone is crashed and collides with the other things, and is provided with a second inflation control device which controls the inflation of the second airbag. The second airbag can inflate by the gas supplied on the basis of the control by the second inflation control device, the inflation is carried out by the control before the drone collides with the other things, and the inflating second airbag surrounds the drone like a ring in a vertical plane.

In a second aspect of the drone with the airbag according to the present invention, the drone provided with a rotary vane generating a lift force is provided with a first airbag which absorbs a shock generated when the drone is crashed and collides with the other things, and is provided with a first inflation control device which controls inflation of the first airbag, the first airbag can inflate by the gas supplied on the basis of a control by the first inflation control device, the inflation is carried out by the control before the drone collides with the other things, and the inflating first airbag surrounds the drone in a horizontal plane.

Further, the drone with the airbag is provided with a second airbag which absorbs the shock generated when the drone is crashed and collides with the other things, and is provided with a second inflation control device which controls the inflation of the second airbag. The second airbag can inflate by the gas supplied by the control of the second inflation control device, the inflation is carried out by the control before the drone collides with the other things, and the inflating second airbag surrounds the drone like a ring in a vertical plane.

In a third aspect of the drone with the airbag according to the present invention, the drone provided with a rotary vane generating a lift force is provided with a first airbag which absorbs a shock generated when the drone is crashed and collides with the other things, and is provided with a first inflation control device which controls inflation of the first airbag. The drone is provided with an arm part which is protruded from a central mounting part in a radial pattern, or one arm part or a plurality of arm parts which are protruded in each of right and left sides of the central mounting part, and the rotary vane generating the lift force by rotation thereof is provided at a front side position of the arm part.

The first airbag is held by a first holding part which is substantially provided in the central mounting part, the first holding part is provided in a folded state with the first airbag which can inflate by the gas supplied by the control of the first inflation control device, and the inflating first airbag is adapted to inflate outward from the first holding part as seen in the horizontal plane. Further, the inflation is carried out by the control before the drone collides with the other things, and the inflating first airbag surrounds the drone in the horizontal plate while putting the central mounting part in the center.

Further, the drone with the airbag is provided with a second airbag which absorbs the shock generated when the drone is crashed and collides with the other things, and is provided with a second inflation control device which controls inflation of the second airbag, and the second airbag is held by a second holding part which is substantially provided in the central mounting part.

The second holding part is provided in a folded state with the second airbag which can inflate by the gas supplied by the control of the second inflation control device, the inflating second airbag is adapted to inflate so as to protrude outward from the second holding part as seen in the vertical plane, the inflation is carried out by the control before the drone collides with the other things, and the inflating second airbag surrounds the drone like a ring in the vertical plane while putting the central mounting part in the center.

A fourth aspect of the drone with the airbag according to the present invention is the second aspect mentioned above, wherein the first airbag surrounds the drone like a ring within the horizontal plane while putting the central mounting part in the center.

A fifth aspect of the drone with the airbag according to the present invention is the third aspect, wherein the first airbag surrounds the drone like a ring in the horizontal plane while putting the central mounting part in the center.

In a sixth aspect of the drone with the airbag according to the present invention, the drone provided with a rotary vane generating a lift force is provided with a first airbag which absorbs a shock generated when the drone is crashed and collides with the other things, and is provided with a first inflation control device which controls inflation of the first airbag, the drone is provided with an arm part which is protruded from a central mounting part in a radial pattern, or one arm part or a plurality of arm parts which are protruded in each of right and left sides of the central mounting part, and the rotary vane generating the lift force by rotation thereof is provided at a front side position of the arm part. The first airbag is held by a first holding part which is substantially provided in the central mounting part.

The first holding part is provided in a folded state with the first airbag which can inflate by the gas supplied by the control of the first inflation control device, the inflating first airbag is adapted to inflate so as to protrude outward from the first holding part as seen in the horizontal plane, the inflation is carried out by the control before the drone collides with the other things, and the inflating first airbag surrounds the drone in the horizontal plane while putting the central mounting part in the center.

Further, the drone with the airbag is additionally provided with a second airbag which absorbs the shock when the drone is crashed and collides with the other things, and is provided with a second inflation control device which controls inflation of the second airbag, the second airbag is constructed by two second airbags, these two second airbags can inflate in such a manner as to pinch the central mounting part in a crossing state, and each of the second airbags is held by a second holding part which is substantially provided in the central mounting part.

The second holding part is provided in a folded state with the second airbag which can inflate by the gas supplied by the control of the second inflation control device, the inflating second airbag is adapted to pinch the central mounting part in the crossing state, the inflation is carried out by the control before the drone collides with the other things, and the inflating second airbag pinches the central mounting part in the crossing state.

A seventh aspect of the drone with the airbag according to the present invention is the drone with the airbag according to any one of the second to sixth aspects, wherein the first airbag is adapted to inflate so as to protrude long upward and/or downward at the same time as inflating so as to protrude outward as seen in the horizontal plane by the supply of the gas.

An eighth aspect of the drone with the airbag according to the present invention is the drone with the air bag according to any one of the second to sixth aspects, wherein the first airbag is adapted to inflate so as to protrude long at least downward at the same time as inflating so as to protrude outward as seen in the horizontal plane by the supply of the gas.

A ninth aspect of the drone with the airbag according to the present invention is the drone with the air bag according to any one of the first to fifth aspects, wherein the second airbag is adapted to inflate so as to protrude long to one side and/or the other side as seen in the surface which is orthogonal to the vertical plane, at the same time as inflating so as to protrude outward as seen in the vertical plane by the supply of the gas.

A tenth aspect of the drone with the airbag according to the present invention is the drone with the air bag according to the third or sixth aspect, wherein the first holding part is connected to a front end part of a first support part which is protruded in the central mounting part, and the first holding part is thereby provided substantially in the central mounting part.

An eleventh aspect of the drone with the airbag according to the present invention is the drone with the air bag according to the third or sixth aspect, wherein the first holding part is connected to a first support part serving as a protective frame which surrounds the rotary vane for protecting the rotary vane, and the first holding part is thereby provided substantially in the central mounting part.

A twelfth aspect of the drone with the airbag according to the present invention is the drone with the air bag according to the third or sixth aspect, wherein the first holding part is connected to a first support part serving as a protective frame which surrounds the rotary vane in its outer side, and the first holding part is thereby provided substantially in the central mounting part.

EFFECT OF THE INVENTION

On the basis of the drone with the airbag according to the present invention, it is possible to effectively prevent the danger that the drone injures the person in the case that the drone collides with the other things such as the person or the building structure, when the drone during the flight becomes an uncontrollable state under the influence of the trouble in the air frame, the abnormal weather or the radio disturbance and is crashed.

DESCRIPTION OF EMBODIMENTS

Embodiment 1

Figure 1:
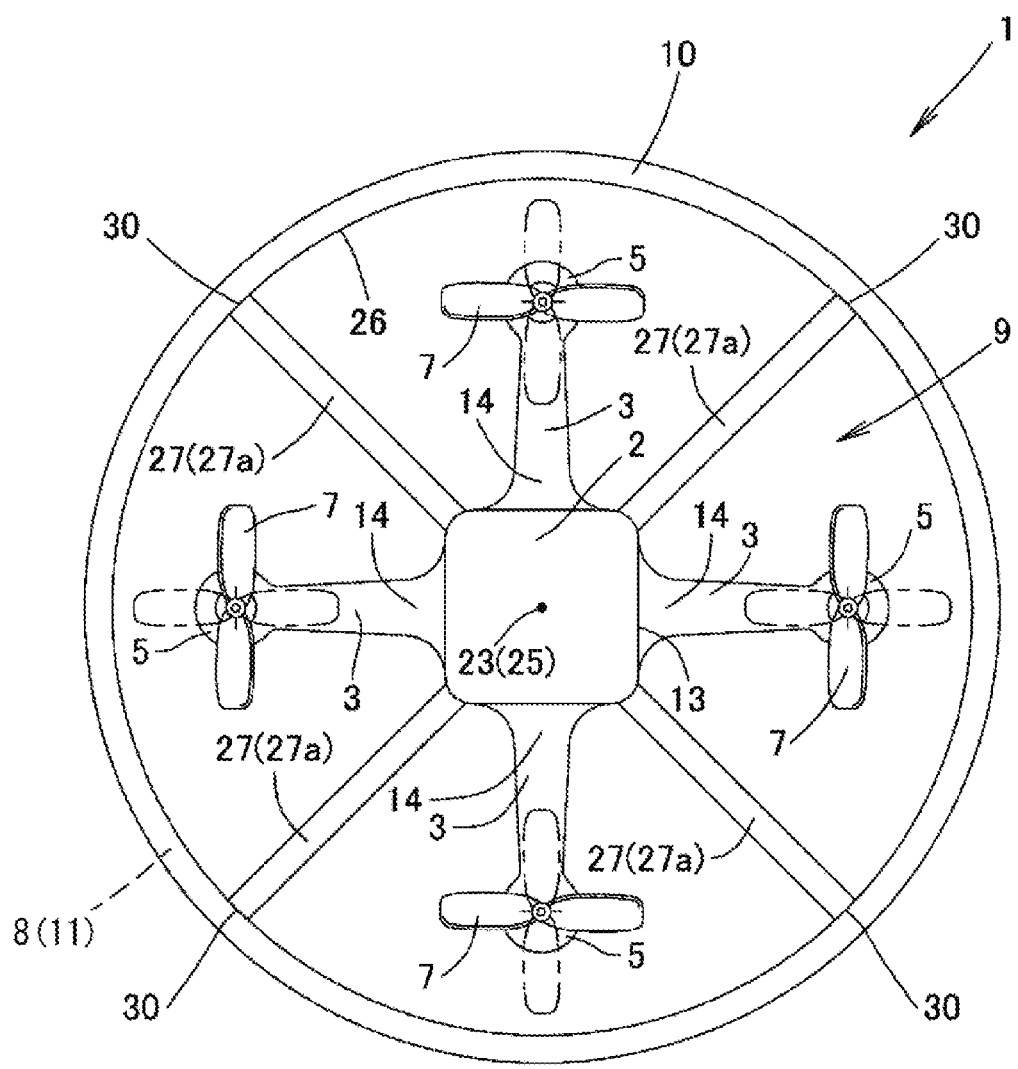
FIG. 1 is a plan view showing a drone with an airbag according to the present invention in a state in which a first airbag is not inflated.
Figure 2:
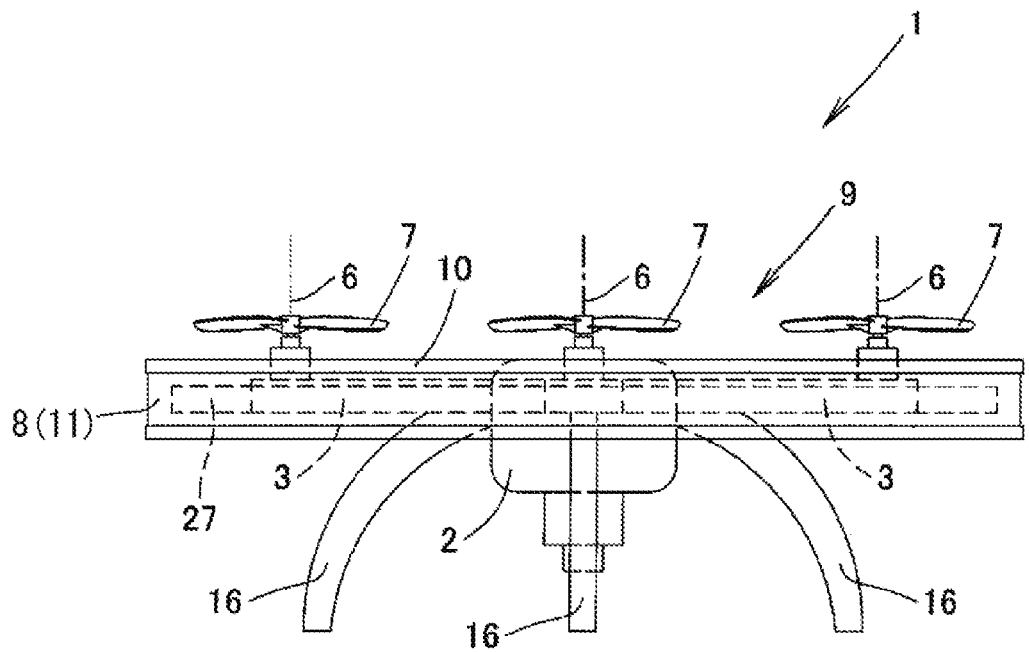
FIG. 2 is a front elevational view showing the drone with the airbag according to the present invention.
Figure 3:
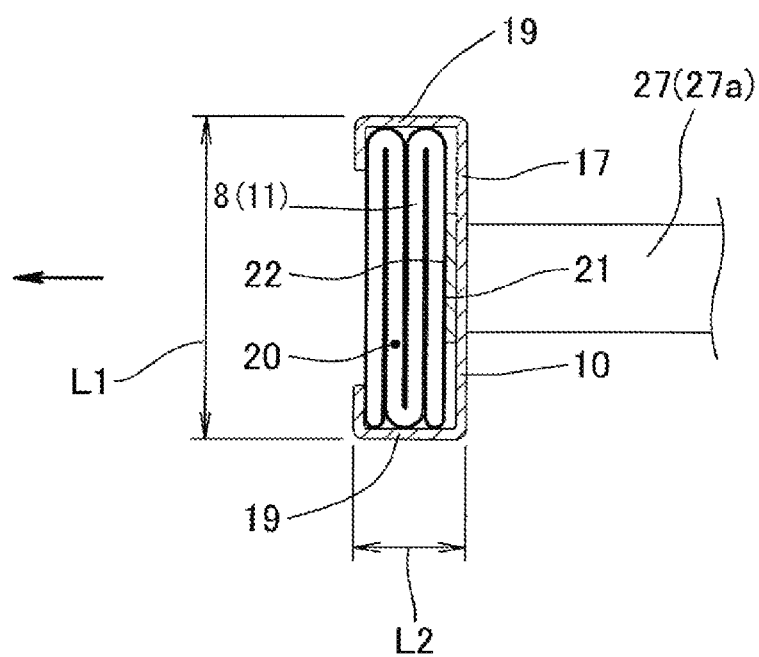
FIG. 3 is a cross sectional view showing a state in which the first airbag is held by a first holding part in a folded state.

In FIGS. 1 to 3, a drone with airbag 1 according to the present invention is structured such that a drone 9 having rotary vanes 7 generating lift force is provided with an airbag 8 which absorbs a shock when the drone 9 is crashed and collides with the other things such as a person and a building structure, and an inflation control device controlling inflation of the airbag 8 is provided. The airbag 8 can be inflated by gas supplied on the basis of a control by the inflation control device, and the inflation is carried out before the drone 9 collides with the other things according to the control.

In the present embodiment, the drone 9 is structured such that arm parts 3 are protruded out of a central mounting part 2 in a radial pattern, and the rotary vane 7 which can rotate around a vertical axis 6 (FIG. 2) is provided in a front side position 5 of each of the arm parts 3. A first holding part 10 is provided in such a manner as to surround the drone 9 while putting the central mounting part 2 at the center. A first airbag 11 (one aspect of the airbag 8) which can be inflated by the supplied gas is attached to the first holding part 10 in a folded state, as shown in FIGS. 2 to 3. In the present embodiment, the first airbag 11 is adapted to be inflated so as to protrude out toward an outer side (a direction shown by an arrow in FIG. 3) of the first holding part 10 as seen in a horizontal plane. Further, the first airbag 11 can be inflated by the gas supplied according to the control by a first inflation control device (one aspect of the inflation control device), and the inflation according to the control is adapted to be carried out before the drone 9 collides with the other things such as the person. The inflated first airbag 11 is adapted to surround the drone 9 in the horizontal plane while putting the central mounting part 2 at the center.

The drone 9 is structured, more specifically as shown in FIGS. 1 to 2, such that four arms parts 3, 3, 3 and 3 are provided in a protruding manner in a radial pattern at an approximately 90 degree angle pitch in the horizontal plane, on an outer surface part 13 of the central mounting part 2 in which an inflator (not shown) for supplying the gas to the first airbag 11 and a trigger device (not shown) thereof are accommodated. Lengths of the arm parts 3 are set to be approximately the same length, the rotary vane 7 which can rotate around the vertical axis 6 is provided in a front side position 5 of each of the arm parts 3, and the lift force is generated by the rotation of the rotary vane 7. Further, in the present embodiment, as shown in FIG. 2, a leg part 16 fixed its upper end to a base part 14 (FIG. 1) of the arm part 3 is provided in a protruding manner so as to protrude out downward in a lower side of each of the arm parts 3.

The first holding part 10 is formed into a circular ring shape existing in the horizontal plane as shown in FIG. 1 in the present embodiment, and is bent in a direction that upper and lower end parts 19 and 19 of a base plate part 17 formed into a circular ring shape face each other, and an accommodation part 20 is formed in an inner part thereof. The first airbag 11 in a small folded state is accommodated in the accommodation part 20 as shown in FIG. 3, and a base part 21 thereof is fixed to a bottom part 22 of the accommodation part 20. In the present embodiment, the first holding part 10 is set its vertical length L1 to about 15 to 30 mm, for example, about 30 mm, and is set its width L2 in a horizontal direction to about 10 to 15 mm, for example, about 10 mm. The circular ring-shaped first holding part 10 having the structure mentioned above is structured, as shown in FIG. 1 in the present embodiment, such that a center 23 thereof is approximately in conformity to a center 25 of the central mounting part 2, and an inner peripheral surface part 26 thereof is positioned somewhat in an outer side of the four rotary vanes 7, 7, 7 and 7.

The first holding part 10 is arranged via a first support part 27 protruded from the central mounting part 2 as shown in FIG. 1 in the present embodiment, and is substantially provided in the central mounting part 2. Further, the first support part 27 is constructed as an arm-shaped support part 27*a* for supporting the first holding part 10, in the present embodiment. The arm-shaped support part 27*a* is provided in a protruding manner on the outer surface part 13 of the central mounting part 2 between the arm parts 3 and 3 which are adjacent in the horizontal plane, and a front end part (a front end in the present embodiment) 30 of each of the arm-shaped support parts 27*a* is connected to the inner peripheral surface part 26 of the first holding part 10. The connection can be achieved by using a known means such as welding, screw fixing and various engaging means. Accordingly, the first holding part 10 is substantially provided in the central mounting part 2 via the first support part 27 as mentioned above.

The first airbag 11 is constructed by using a resin raw material which is soft and has a desired strength, such as polyurethane, vinyl chloride, and nylon, the first airbag 11 in a folded state is housed in the accommodation part 20 as mentioned above, and a base part 21 thereof is fixed to the bottom part 22 of the accommodation part 20.

Figure 4:
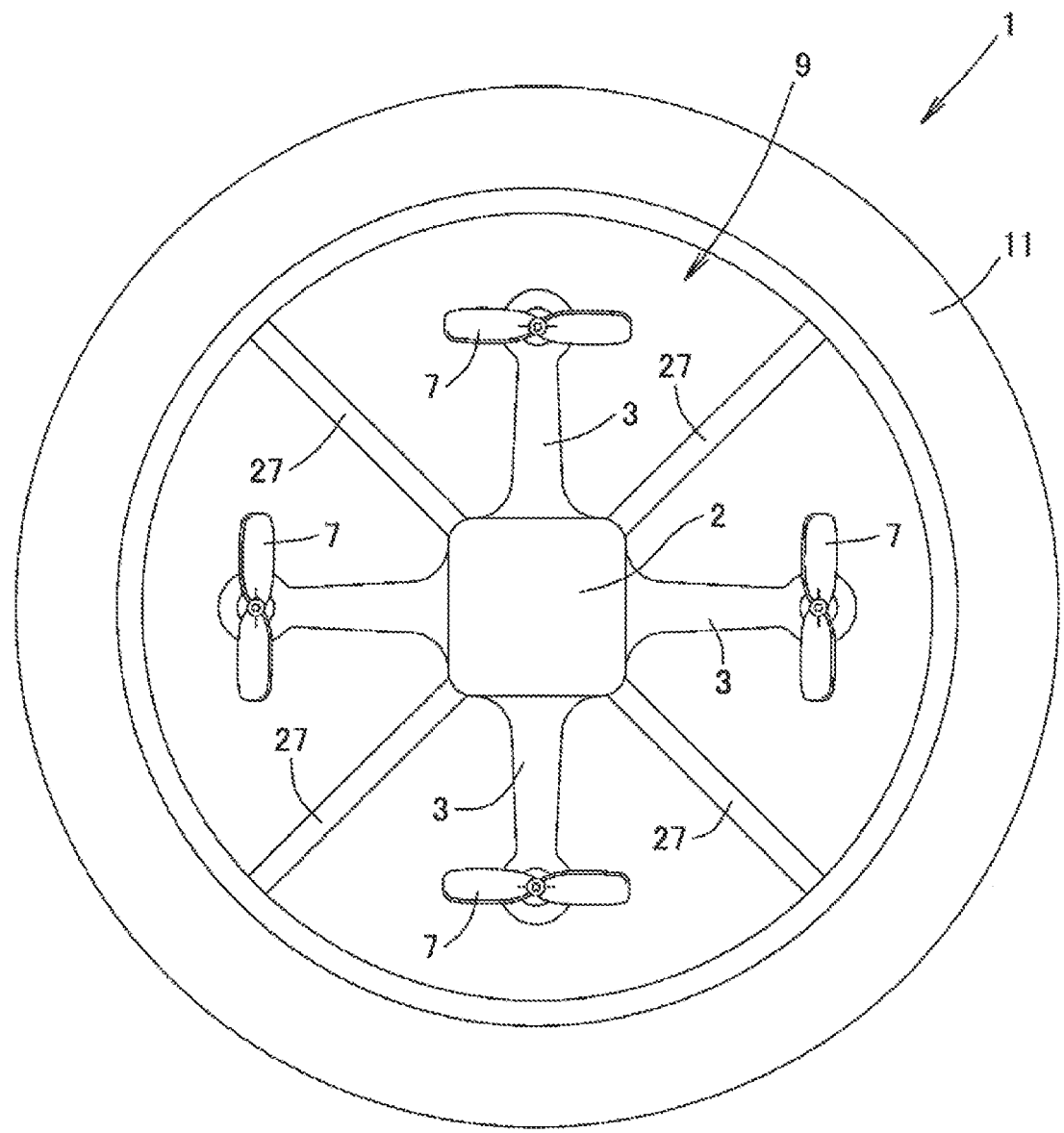
FIG. 4 is a plan view showing the drone with the airbag according to the present invention in a state in which the first airbag is inflated.
Figure 5:
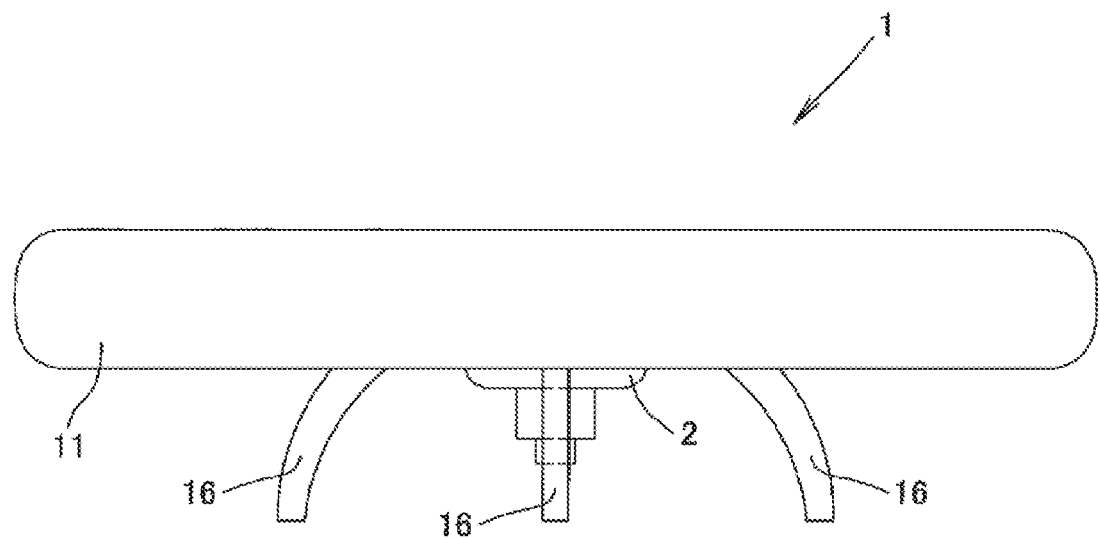
FIG. 5 is a front elevational view showing the drone with the airbag according to the present invention in a state in which the first airbag is inflated.
Figure 6:
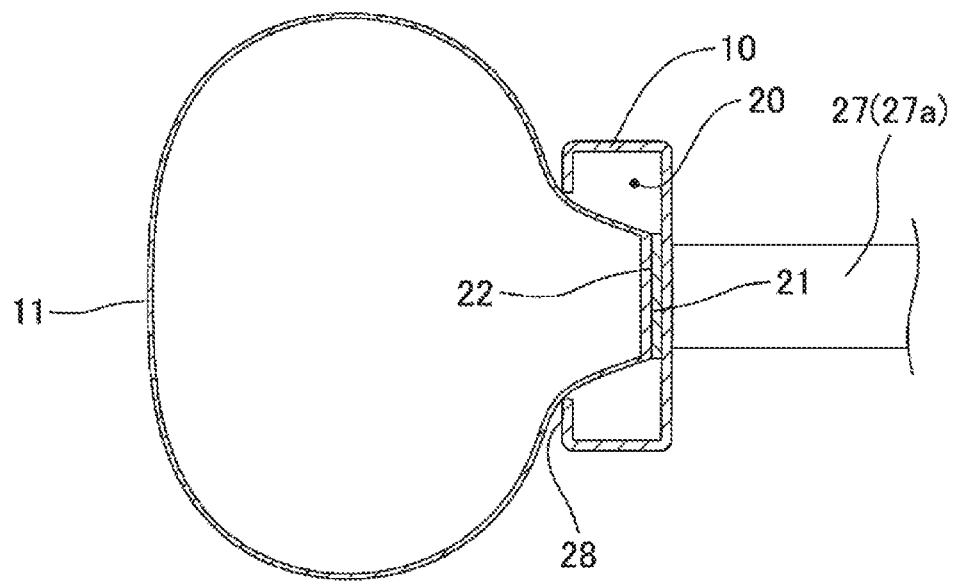
FIG. 6 is a cross sectional view showing a state in which the first airbag held by the first holding part is inflated.

Further, the gas flows from the inflator via an opening part (not shown) into the first airbag 11 in the folded state as mentioned above, and the first airbag 11 is rapidly inflated. A state in which the first airbag 11 is inflated is shown in FIGS. 4 to 6. The first airbag 11 inflated as mentioned above is structured, as shown in FIG. 6, such that the first airbag 11 is inflated in such a manner as to protrude outward from a front end edge 28 of the first holding part 10 in a state in which the base part 21 of the first airbag 11 is kept being fixed to the bottom part 22 of the accommodation part 20. The first airbag 11 is adapted to be inflated so as to protrude outward, for example, at about 30 to 50 mm. An amount of protrusion is appropriately set according to a shape and a size of the drone in such a manner as to effectively prevent the danger that the drone 1 injures the person in the case that the drone 1 collides with the other things such as the person as mentioned later.

The first inflation control device is provided with a detecting means (not shown) which automatically detects the fact that the drone 9 during the flight becomes uncontrollable under the influence of a trouble in the air frame, the abnormal weather or the radio disturbance, and an actuating means (not shown) which actuates the inflator on the basis of a detection signal of the detecting means before the collision with the other things such as to the person.

Accordingly, in the case that the drone 9 during the flight becomes uncontrollable under the influence of the trouble in the air frame, the abnormal weather or the radio disturbance, the detecting means automatically detects the fact, and actuates the inflator on the basis of the detection signal of the detecting means before the collision with the other things such as the person, and the gas supplied from the inflator inflates the first airbag 11 via a gas piping (not shown) as mentioned above. As a result, the drone 9 comes to a state in which the drone 9 is surrounded in the horizontal plane by the first airbag 11 in the inflated state shown in FIGS. 4 to 7 while putting the central mounting part 2 at the center. Since the uncontrollable drone 9 tends to be crashed in a state in which the first airbag 11 is in an approximately horizontal state or an inclined state, the first airbag 11 in the inflated state achieves a good buffer action even in the case that the crashed drone 9 collides with the other things such as the person. Therefore, it is possible to effectively prevent the danger that the drone 1 injures the person in the case that the drone 1 collides with the other things such as the person.

Embodiment 2

Figure 7:
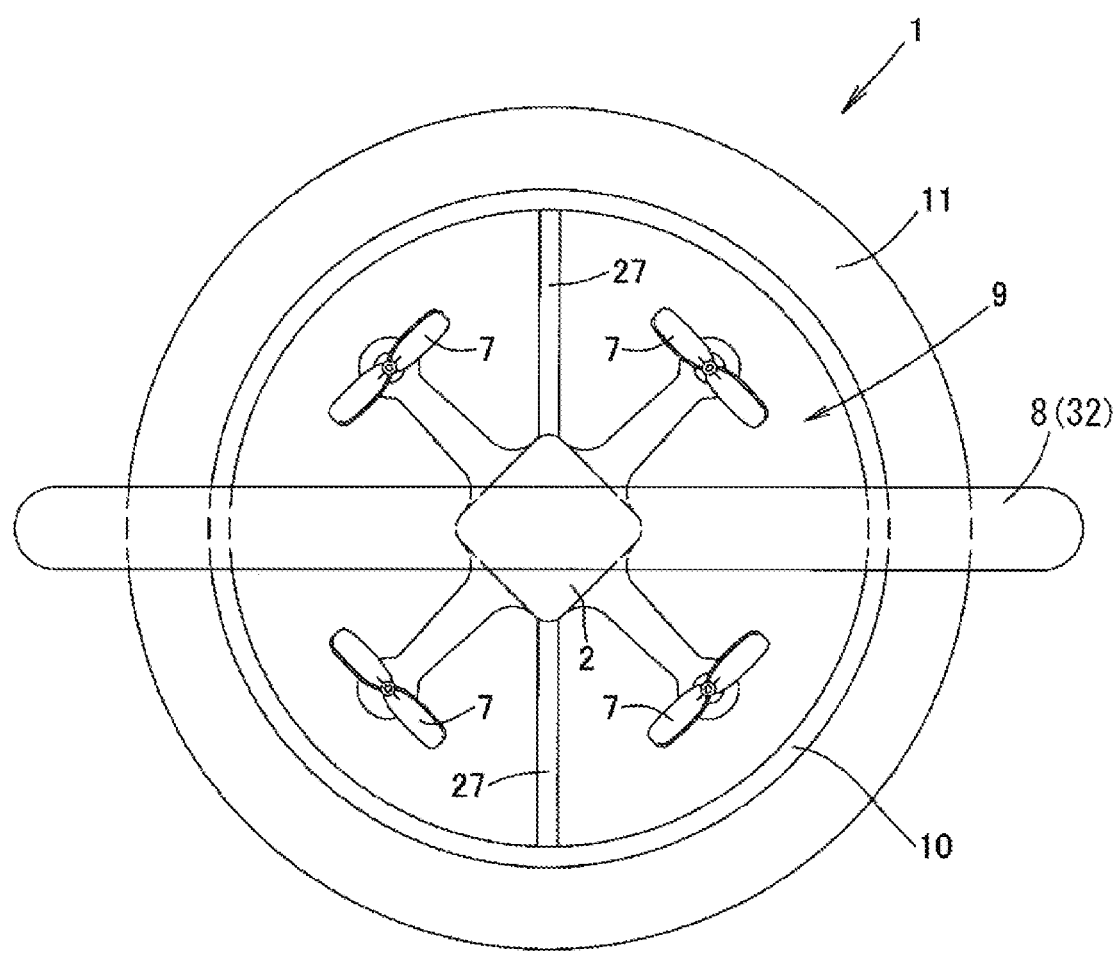
FIG. 7 is a plan view showing the drone with the airbag according to the present invention in a state in which the first airbag and a second airbag are both inflated.
Figure 8:
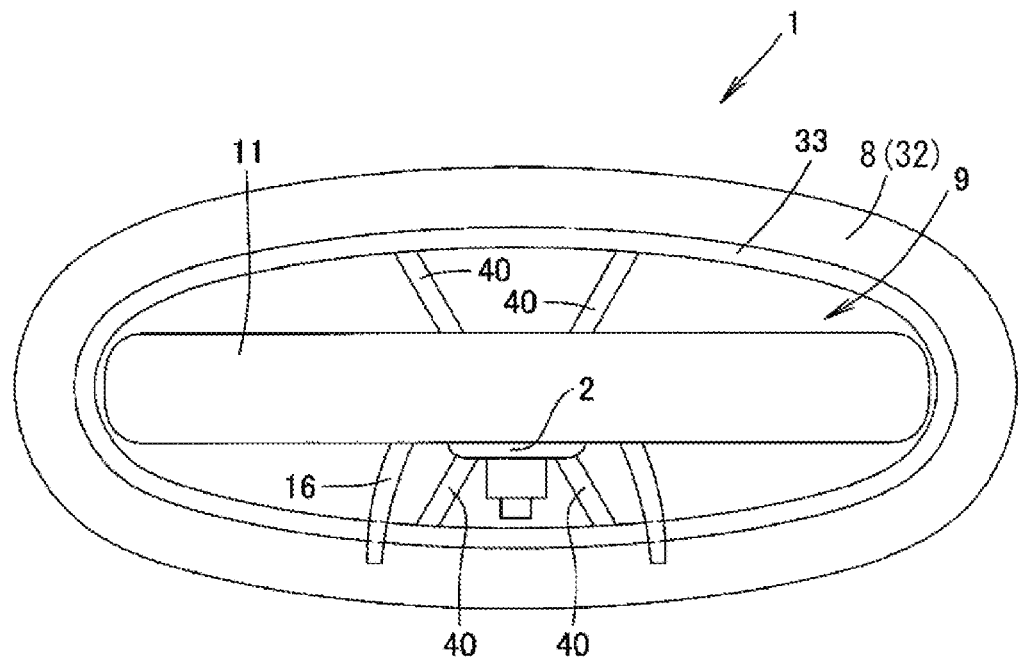
FIG. 8 is a front elevational view showing the drone with the airbag according to the present invention in a state in which the first airbag and the second airbag are both inflated.

The drone with airbag 1 shown in FIGS. 7 to 8 is provided with a second airbag (one aspect of the airbag 8) 32 in addition to the first airbag 11, and is provided with a second inflation control device (one aspect of the inflation control device) which controls inflation of the second airbag 32. The second inflation control device is provided with a detecting means (not shown) which automatically detects the fact that the drone 9 during the flight becomes uncontrollable under the influence of the trouble in the air frame, the abnormal weather or the radio disturbance, and an actuating means (not shown) which actuates the inflator mentioned above on the basis of a detection signal of the detecting means before the collision with the other things such as the person, in the same manner as the embodiment mentioned above.

Figure 9:
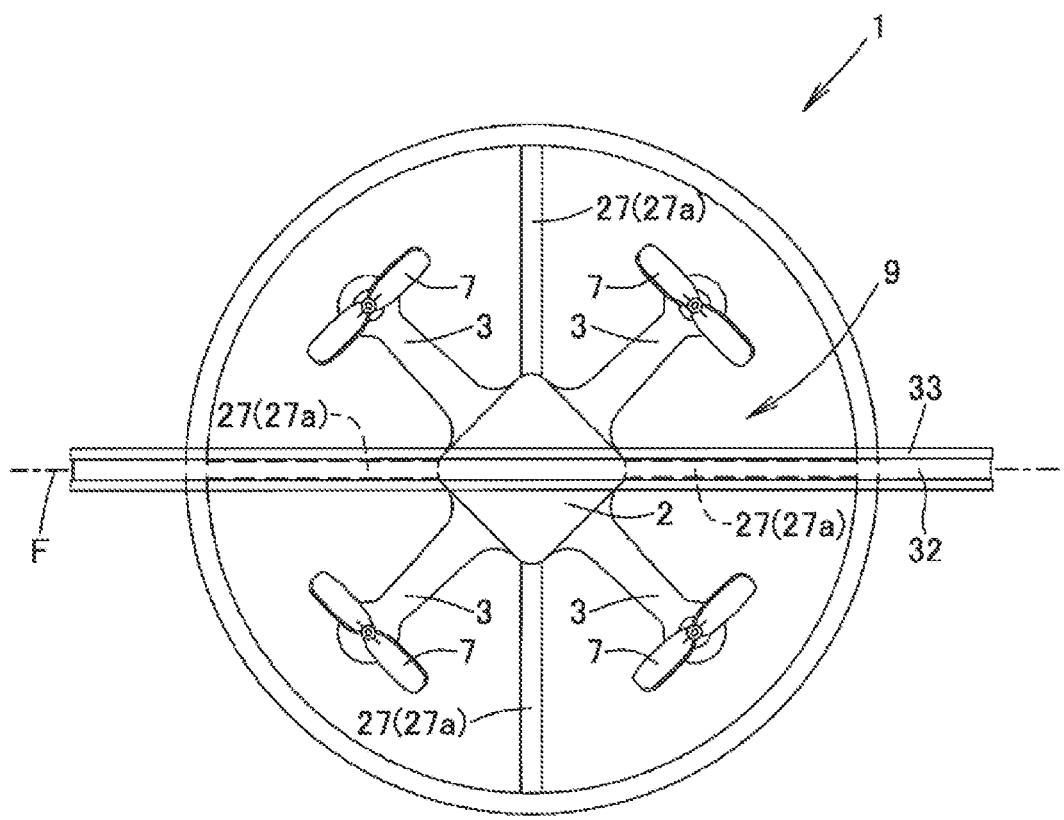
FIG. 9 is a plan view showing the drone with the airbag according to the present invention in a state in which none of the first airbag and the second airbag are inflated.
Figure 10:
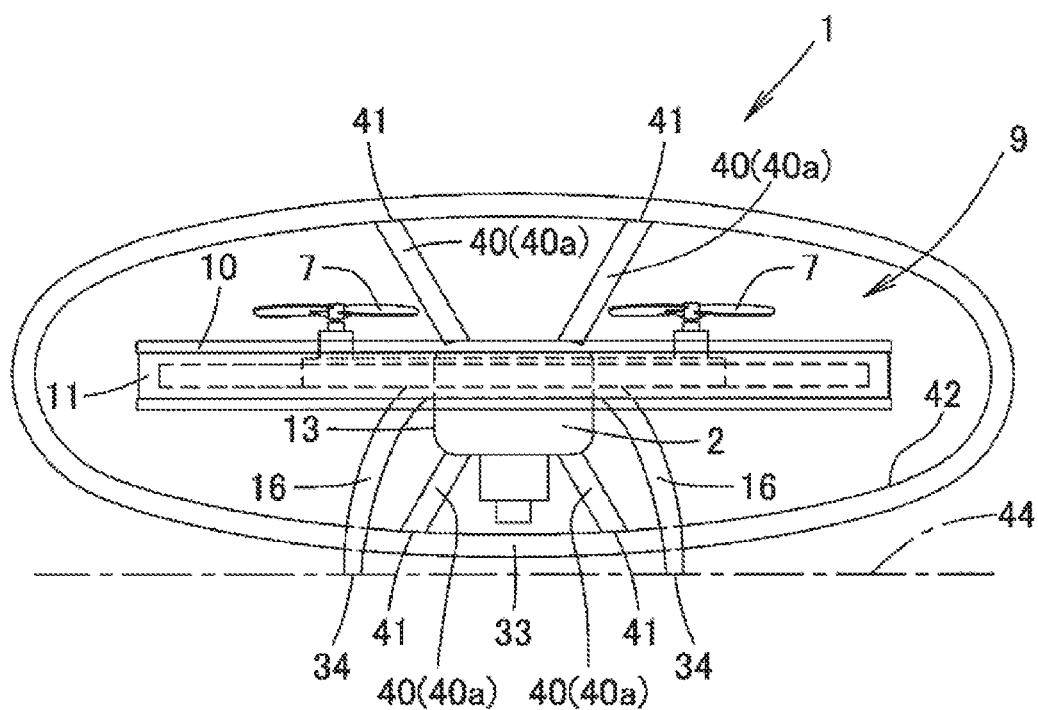
FIG. 10 is a front elevational view showing the drone with the airbag according to the present invention in a state in which none of the first airbag and the second airbag are inflated.
Figure 11:
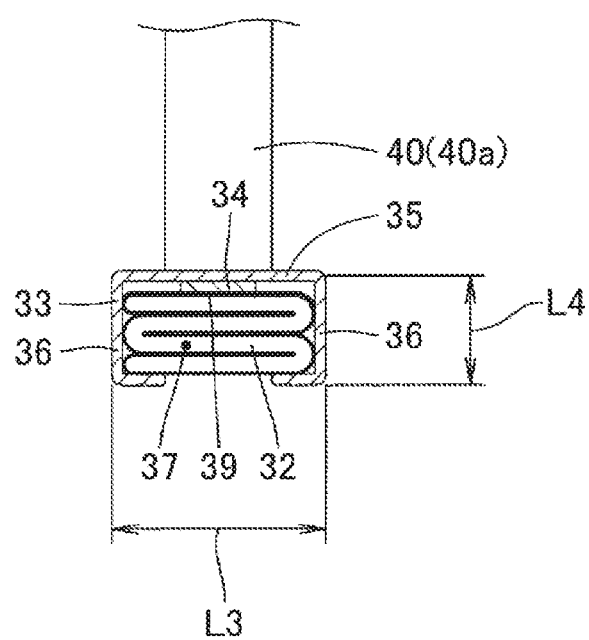
FIG. 11 is a cross sectional view showing a state in which the second airbag is held by a second holding part in a folded state.

More specifically, as shown in FIGS. 9 to 10, a second holding part 33 is provided in such a manner as to surround the drone 9 in the vertical plane while putting the central mounting part 2 at the center, and the second airbag 32 which can be inflated so as to protrude outward by the supplied gas is attached to the second holding part 33 in a folded state as shown in FIG. 11.

The second holding part 33 is formed into a circular ring shape or an oval ring shape existing in the vertical plane, and is arranged between the adjacent arm parts 3 and 3 in the present embodiment as shown in FIGS. 9 to 10.

More specifically, the second holding part 33 is formed into an oval ring shape which is long in a horizontal direction and is comparatively short in a vertical direction, as seen in a vertical plane including an axis F of the arm-shaped support parts 27*a* and 27*a* which are arranged linearly between the arm parts 3 and 3, as shown in FIGS. 9 to 10. Further, the central mounting part 2 is adapted to be received in an inner side of the oval ring-shaped second holding part 33. Further, a lower end of the leg part 16 is made somewhat protrude downward in the second holding part 33 in such a manner that a lower end 34 of the leg part 16 in the drone 9 can ground on a ground plane 44 in a front view shown in FIG. 10.

Further, the second holding part 33 is arranged via a second support part 40 which is provided in a protruding manner on the outer surface part 13 of the central mounting part 2, as shown in FIG. 10. The second support part 40 is constructed as an arm-shaped support part 40*a* which is provided in a protruding manner vertically in the outer surface part 13 in the central mounting part 2, and a front end part (a front end in the present embodiment) 41 of each of the arm-shaped support parts 40*a* is connected to an inner peripheral surface part of the second holding part 33. As a result, the second holding part 33 is substantially provided in the central mounting part 2 via the second support part 40.

Further, the second holding part 33 is bent in a direction that right and left end parts 36 and 36 of a base plate part 35 formed into an oval ring shape face each other, as seen in a surface which is orthogonal to the vertical plane, and an accommodation part 37 is formed in an inner part thereof, as shown in FIG. 11. Further, the second airbag 32 in the small folded state is accommodated in the accommodation part 37 as shown in FIG. 11, and the base part 34 thereof is fixed to a bottom part 39 of the accommodation part 37. Further, the second holding part 33 is set its lateral width L3 to about 15 to 30 mm, for example, about 20 mm, and set its width L3 in an internal direction thereof (a direction toward the central mounting part 2) to about 10 to 15 mm, for example, about 10 mm, in FIG. 11. The second holding part 33 formed into the oval ring shape according to the structure mentioned above is substantially provided in the central mounting part 2.

Figure 12:
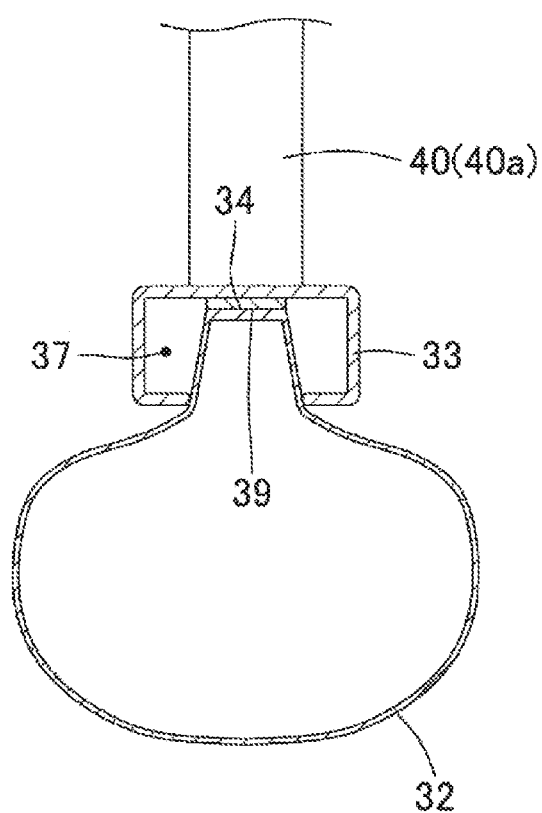
FIG. 12 is a cross sectional view showing a state in which the second airbag held by the second holding part is inflated.

The second airbag 32 held in the folded state by the second holding part 33 having the structure mentioned above can be inflated by the gas supplied on the basis of the control according to the second inflation control device (one aspect of the inflation control device). Further, the inflation is carried out before the drone 9 collides with the other things such as the person according to the control. Further, as shown in FIGS. 12 and 7 to 8, the inflated second airbag 32 is adapted to surround the drone 9 in the vertical plane while putting the central mounting part 2 at the center.

The second airbag 32 is constructed by using the resin raw material which is soft and has the desired strength such as the polyurethane, the vinyl chloride or the nylon, in the same manner as that in the first airbag 11, the second airbag 32 in the folded state is accommodated in the accommodation part 37 (FIG. 11), and the base part 34 thereof is fixed to the bottom part 39 of the accommodation part 37.

Further, the gas flows from the inflator (not shown) into the second airbag 32 in the folded state as mentioned above through an opening part (not shown), and the second airbag 32 is adapted to be rapidly inflated. The state in which the second airbag 32 is inflated is shown in FIGS. 7, 8 and 12, and the second airbag 32 is inflated in such a manner as to protrude outward from the second support part 40. The second airbag 32 is adapted to be inflated in such a manner as to protrude outward, for example, about 30 to 50 mm. An amount of protrusion is appropriately set according to the shape and the size of the drone, in such a manner as to effectively prevent the danger that the drone 1 injures the person in the case that the drone 1 collides with the other things such as the person, as mentioned later.

The second inflation control device is provided with a detecting means (not shown) which automatically detects the fact that the drone 9 during the flight becomes uncontrollable under the influence of the trouble in the air frame, the abnormal weather or the radio disturbance, and the actuating means (not shown) which actuates the same inflator as mentioned above on the basis of the detection signal of the detecting means before the collision with the other things such as to the person.

Accordingly, in the case that the drone 9 during the flight becomes uncontrollable under the influence of the trouble in the air frame, the abnormal weather or the radio disturbance, the detecting means of the first inflation control device and the detecting means of the second inflation control device automatically detect the fact, and actuate the inflator on the basis of the detection signals of the detecting means before the collision with the other things such as the person, and the gas supplied from the inflator inflates the first airbag 11 and the second airbag 32 via the gas piping (not shown) as mentioned above. As a result, the drone 9 comes to a state in which the drone 9 is surrounded in the horizontal plane by the first airbag 11 in the inflated state shown in FIGS. 4 to 6 while putting the central mounting part 2 at the center. Further, the drone 9 comes to a state in which the drone 9 is surrounded in the vertical plane by the second airbag 32 in the inflated state while putting the central mounting part 2 at the center, as shown in FIGS. 7 to 8 and 12.

Therefore, even in the case that the crashed drone 9 collides with the other things such as the person, the first airbag 11 and the second airbag 32 in the inflated state achieve a good buffer action. As a result, it is possible to prevent the danger that the drone 9 collides with the other things and injures the person. Particularly, in the present embodiment, since the second airbag 32 is provided in addition to the first airbag 11, the buffer action can be achieved in the horizontal direction and the vertical direction. Therefore, it is possible to more effectively prevent the danger that the drone 9 collides with the person and injures the person.

Embodiment 3

Figure 13:
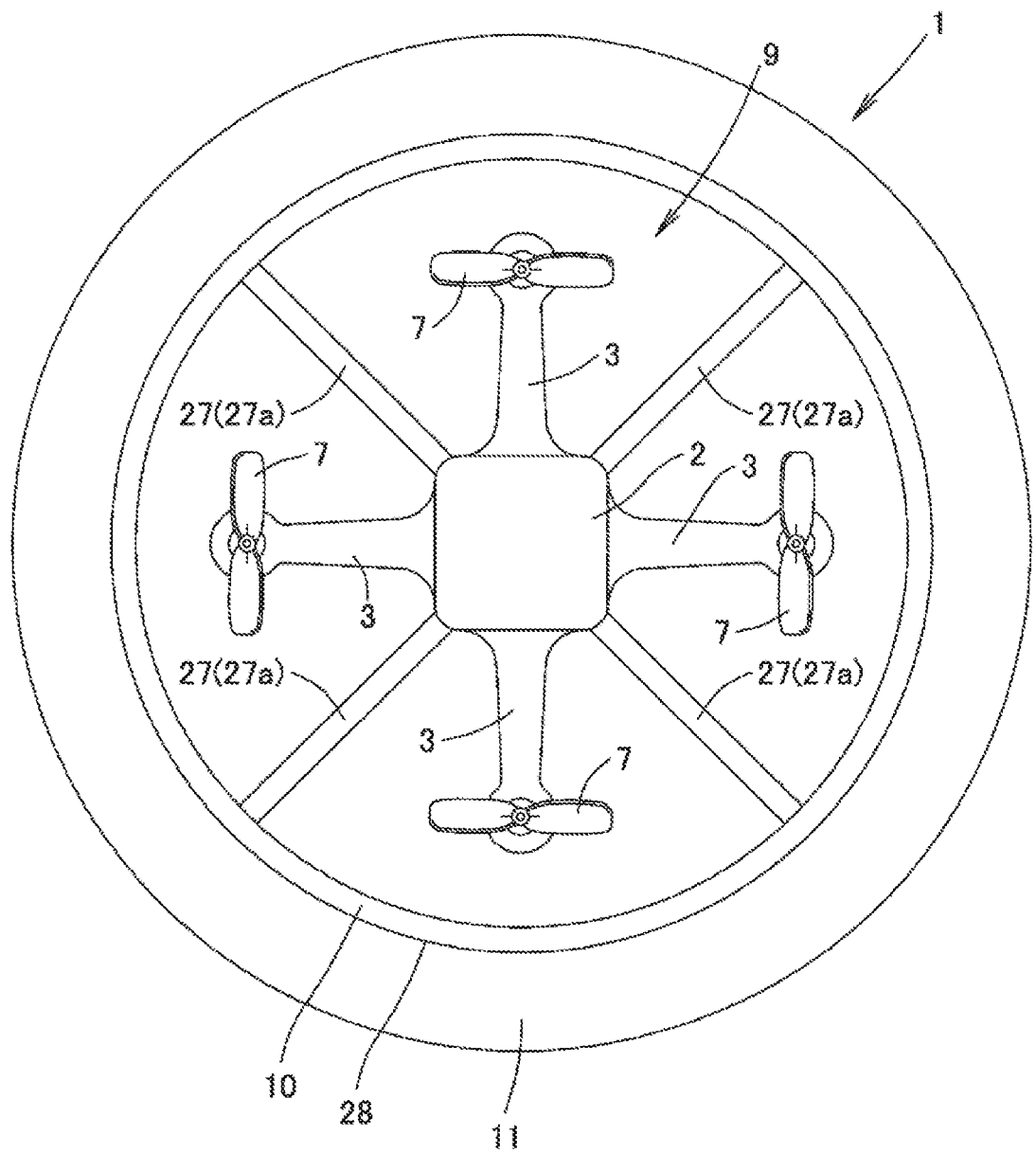
FIG. 13 is a plan view showing the drone with the airbag in a state in which the first airbag is inflated from the beginning.

The drone with airbag 1 shown in FIG. 13 is structured such that the first airbag 11 having the same structure as mentioned above is attached to the first holding part 10 in the drone with airbag 1 shown in the embodiment 1, and the first airbag 11 is in an inflated state from the beginning by the supplied gas. In this case, the first airbag 11 is provided in such a manner as to surround the drone 9 in the horizontal plane (for example, in such a manner as to surround in the horizontal plane while putting the central mounting part at the center) in the same manner as mentioned above. Further, according to the drone with airbag 1 mentioned above, it is also possible to effectively prevent the danger that the crashed drone injures the person even in the case that the crashed drone collides with the other things such as the person.

Embodiment 4

It goes without saying that the present invention is never limited to the structures shown by the embodiments mentioned above, but can be variously design changed within the scope of "claims". Examples of such design change are as follows.

(1) In the case that the drone 9 is structured such that the arm parts 3 are provided so as to protrude in the radial pattern from the central mounting part 2, and the rotary vane 7 generating the lift force by the rotation thereof around the vertical axis 6 is provided in the front side position 5 of each of the arm parts 3 (FIG. 1), the drone 9 is not limited to be structured such that all the arm parts 3 are provided so as to protrude from the same point in the central mounting part 2 (for example, the center point of the central mounting part 2).

Figure 14:
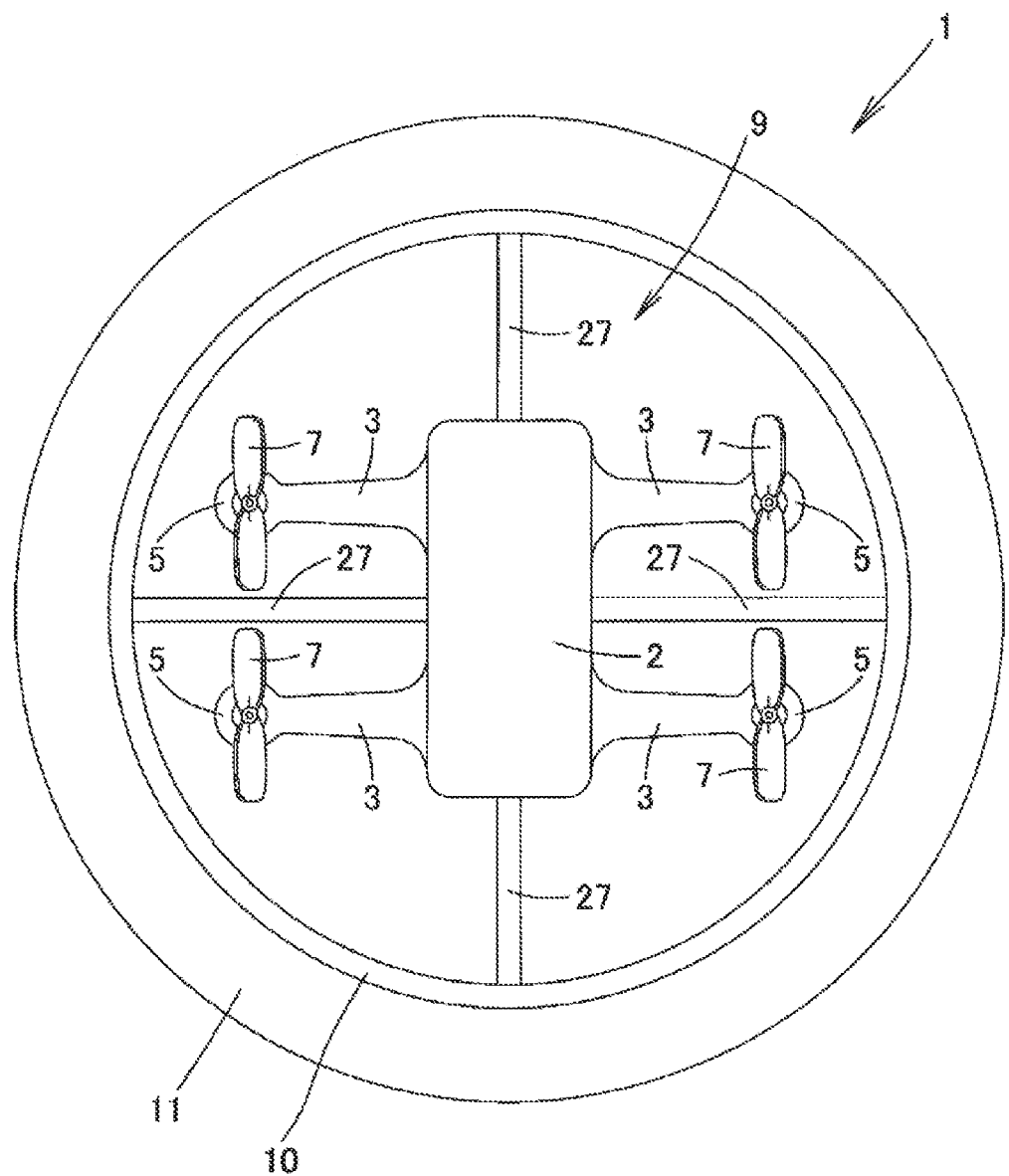
FIG. 14 is a plan view showing the drone with the airbag constructed by using a drone in which an arm part is provided in a protruding manner in each of right and left sides of a central mounting part.

(2) The drone 9 may be structured, for example, as shown in FIG. 14, such that a plurality of arm parts 3 (for example, two arm parts 3 and 3) are provided in a protruding manner in each of right and left sides of the central mounting part 2, and the rotary vanes 7 generating the lift force by the rotation thereof around the vertical axis 6 (FIG. 2) are provided in the front side positions 5 of the arm parts 3. In this case, the first holding part 10 is arranged in the same manner as mentioned above. Further, as shown in FIG. 14, the first airbag 11 held by the first holding part 10 can be inflated in such a manner as to surround the drone 9 in the horizontal plane.

Figure 15:
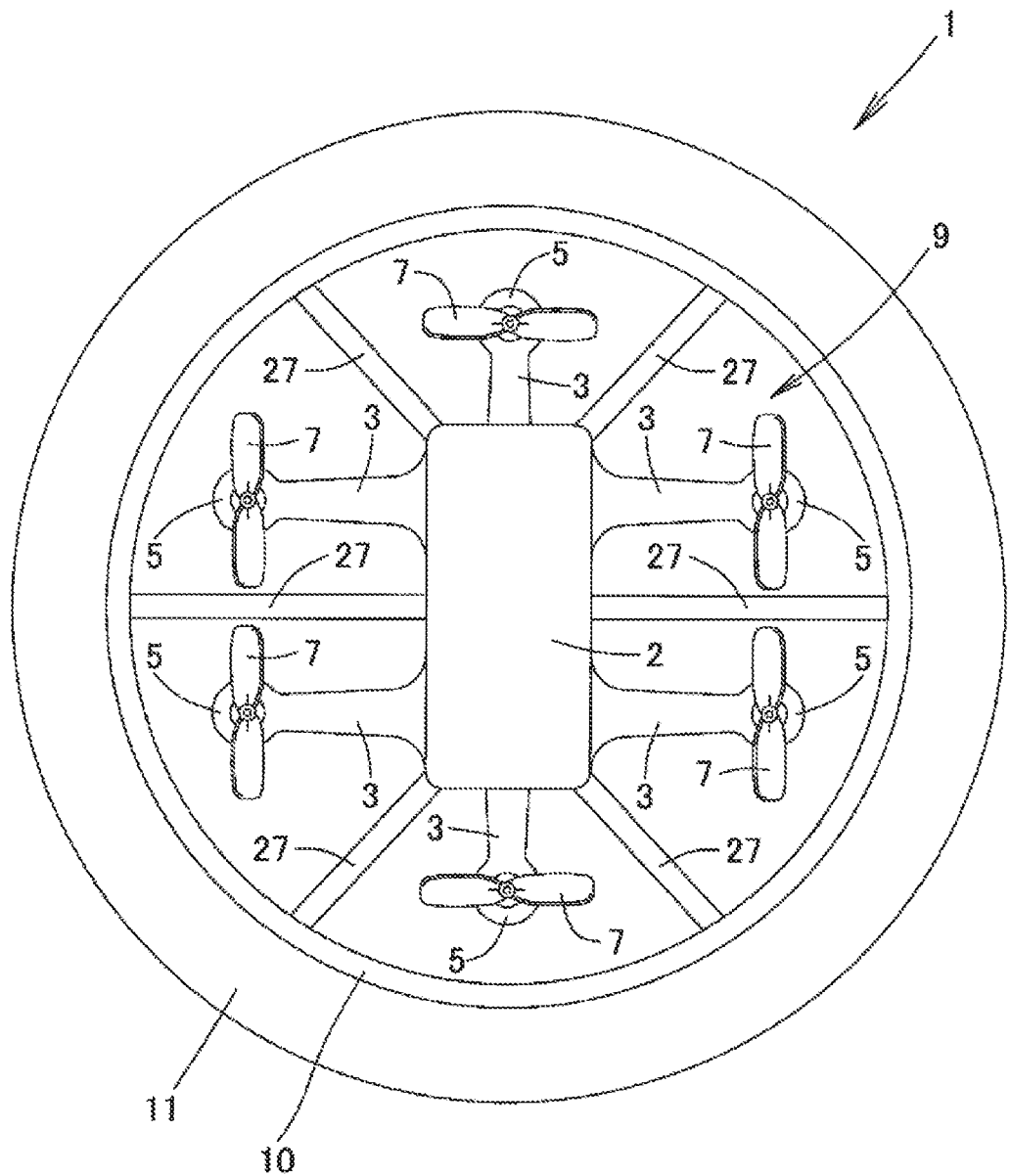
FIG. 15 is a plan view showing the other aspect of the drone with the airbag constructed by using the drone in which the arm part is provided in a protruding manner in each of the right and left sides of the central mounting part.

The right and left sides in the present invention mean the facing sides as seen when putting the central mounting part 2 at the center, and are not limited to the right and left sides as shown in FIG. 14. For example, as shown in FIG. 15, the arm parts 3 and 3 may be provided in a protruding manner in right and left sides corresponding to upper and lower facing sides in the drawing.

(3) The shape of the first airbag 11 in a plan view can be set to various shapes according to the shape of the drone 9, in addition to the circular ring shape mentioned above, the first airbag 11 being provided in such a manner as to surround the drone 9 in the horizontal plane and being in the inflated state.

For example, in the case that the number of the arm parts 3 is set to three with the 120 degree angle pitches, the shape of the first airbag 11 in the inflated state in the plan view may be set to a triangular ring shape. Further, in the case that the number of the rotary vanes 7 is intended to be increased for generating the greater lift force, the number of the arm parts 3 protruded outward from the central mounting part 2 is increased. In the case that the number thereof is five, six or eight, for example, the shape of the first airbag 11 in the inflated state in the plan view may be set to a pentagonal ring shape, a hexagonal ring shape, an octagonal ring shape or an oval ring shape in addition to the circular ring shape. Further, the shape may be set to a quadrangular ring shape in the case that the number of the arm parts 3 is four as mentioned above.

In the case that the shape of the first airbag 11 in the inflated state in the plan view is set to the other shapes than the circular ring shape as mentioned above, the shape of the first holding part 10 may be set to such the ring shape since the first airbag 11 is differently inflated in the respective parts thereof, in addition to the shape of the first holding part 10 set as mentioned above. Same applies to the second airbag 32.

(4) The shape of the inflated second airbag is set to various shapes in such a manner as to contribute to the prevention of the danger against the other things such as the person when the drone 1 is crashed, regardless of the provision of the leg part 16 in the drone 1.

Figure 16:
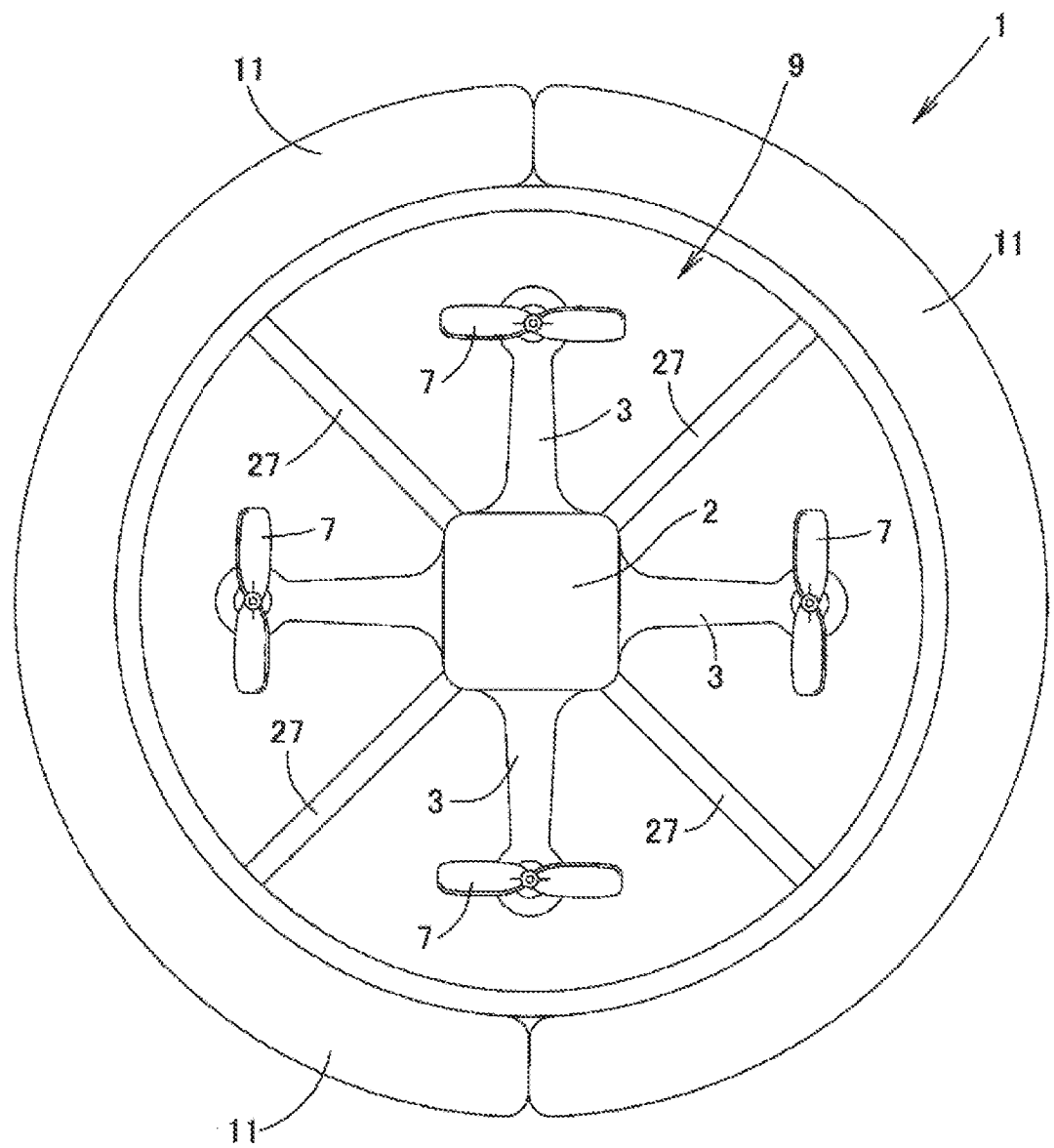
FIG. 16 is a plan view showing a drone with an airbag in which a first airbag is separated into two sections.
Figure 17:
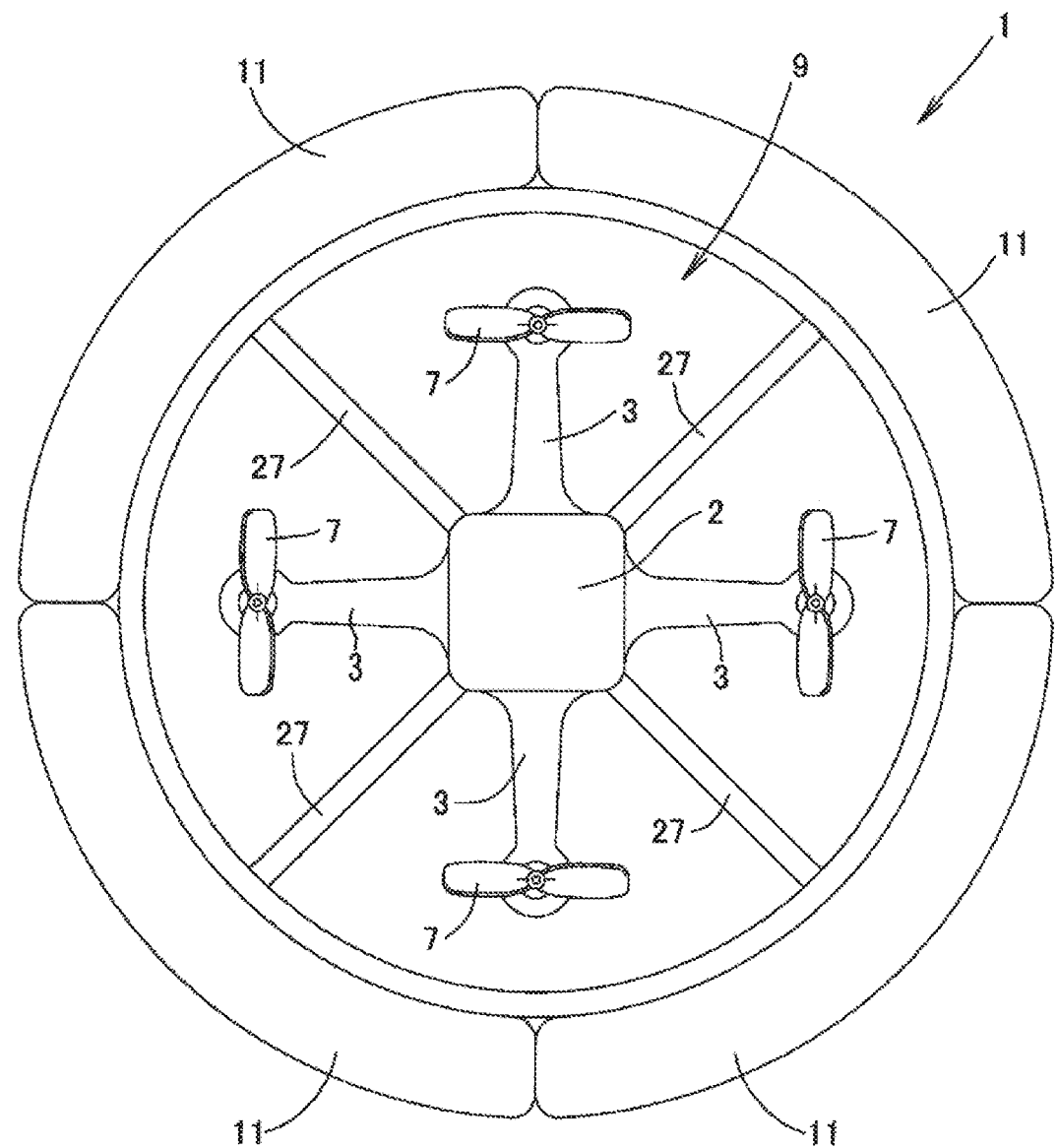
FIG. 17 is a plan view showing a drone with an airbag in which a first airbag is separated into four sections.

(5) As long as the first airbag 11 can effectively prevent the danger when the crashed drone collides with the other things such as the person, the first airbag 11 is not essentially provided continuously in the horizontal plane, but may be provided intermittently with spaces. Alternatively, the first airbag 11 may be continuously constructed via connection parts which are not inflated, in spite of the continuous state of the first airbag 11 in the horizontal plane. For example, it may be constructed as a two-divided continuous state as shown in FIG. 16 or a four-divided continuous state as shown in FIG. 17. Same applies to the second airbag 32.

(6) The first holding part 10 to which the first airbag 11 is attached is not necessarily provided continuously in the state of surrounding the drone 9 as seen in the horizontal plane. The first holding part 10 may be provided in an intermittent state in a plan view as long as the first holding part 10 can stably hold the first airbag 11 in the inflated state with a desired shape. The provision in the intermittent state as mentioned above is applied to the second holding part 33 in the same manner.

(7) The distance between the front end of the inflated second airbag 32 as seen in the vertical plane and the center of the central mounting part 2 may be set to the same level in the upper and lower sides as shown in FIG. 8, with regard to the upper part and the lower part of the second airbag 3. Alternatively, the distance in the lower part may be set to be larger than the distance in the upper part, or the distance in the upper part may be inversely set to be larger than the distance in the lower part. Whether the distance in the lower part is set to be larger or the distance in the upper part is set to be larger is set in such a manner as to make the danger that the crashed drone 9 injures the person when the crashed drone 9 collides with the other things such as the person smaller, while taking into consideration the shape and the structure of the drone 9.

For example, in the case that the degree of protrusion in the lower surface part of the central mounting part 2 is great, the distance in the lower part can be set to be larger. On the contrary, in the case that the degree of protrusion in the upper surface part of the central mounting part 2 is great, the distance in the upper part can be set to be larger.

The protruding state of the second airbag 32 as mentioned above can be set by deviating the center of the second holding part 33 to the lower side in relation to the center of the central mounting part 2 or deviating the center of the second holding part 33 to the upper side, in the case that the second holding part is formed into the oval ring shape as shown in FIG. 10. Alternatively, in the case shown in FIG. 10, it can be achieved by structuring such that the second airbag 32 attached in the folded state to the lower part of the second holding part 33 can be inflated in such a manner as to protrude outward more than the second airbag 32 attached in the folded state to the upper part of the second holding part 33. In the case of structuring as mentioned above, the second airbag 32 is preferably formed into a state in which the second airbag 32 is divided into two sections, that is, the upper part and the lower part.

Figure 18:
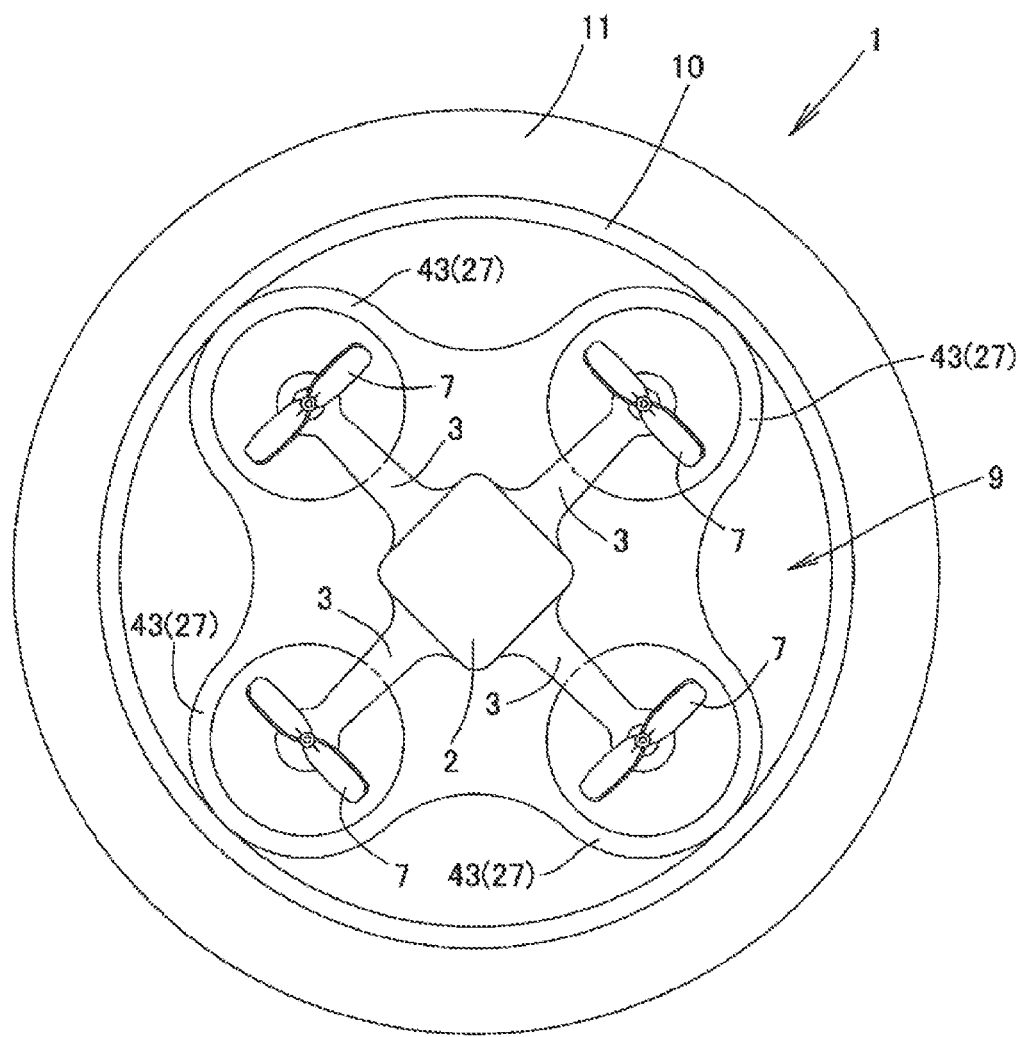
FIG. 18 is a plan view showing a drone with an airbag constructed by using a drone which is provided with an annular protective frame protecting a rotary vane.
Figure 19:
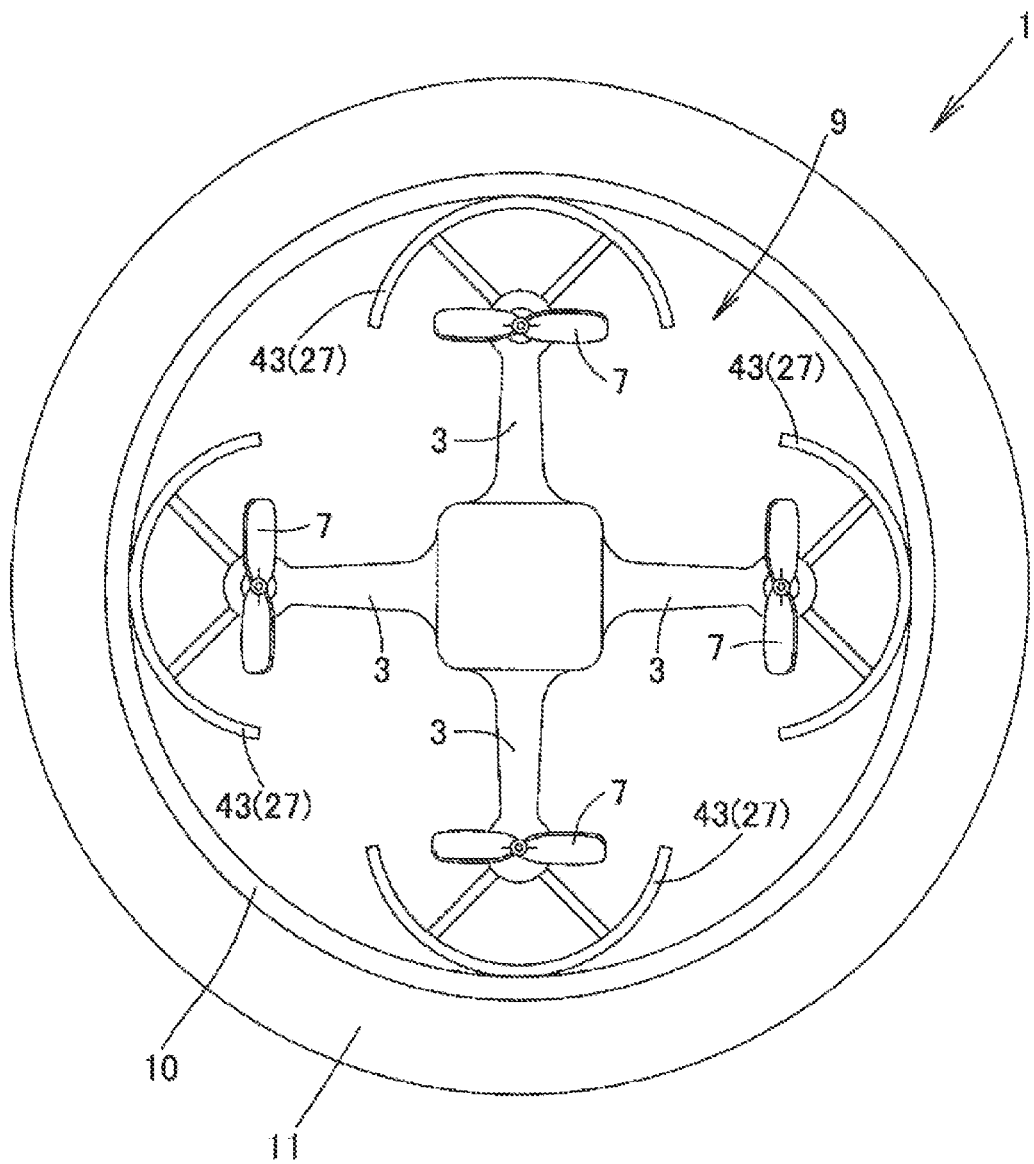
FIG. 19 is a plan view showing a drone with an airbag constructed by using a drone which is provided with a circular arc shaped protective frame protecting a rotary vane.

(8) The first support part 27 and the second support part 40 are not limited to protrude directly from the center mounting part 2, as shown by the embodiment 1 and the embodiment 2. For example, in the case that the drone 9 is provided with protective frames 43 which are formed into a circular shape such as an annular shape surrounding the rotary vanes 7 for protecting the rotary vanes 7, or protective frames 43 which are formed into a circular arc shape surrounding the rotary vanes 7 in its outer side, as shown in FIG. 18 or FIG. 19, the protective frame 43 may be used as the first support part 27. In FIG. 18, each of the protective frames 43 is provided in the central mounting part 2. Further, in FIG. 19, each of the protective frames 43 is provided in the arm part 3. In the case that the first support part 27 and the second support part 40 are provided as mentioned above, the first airbag 11 and the second airbag 32 correspond to be held by the first holding part 10 and the second holding part 33 which are substantially provided in the central mounting part 2.

Figure 20:
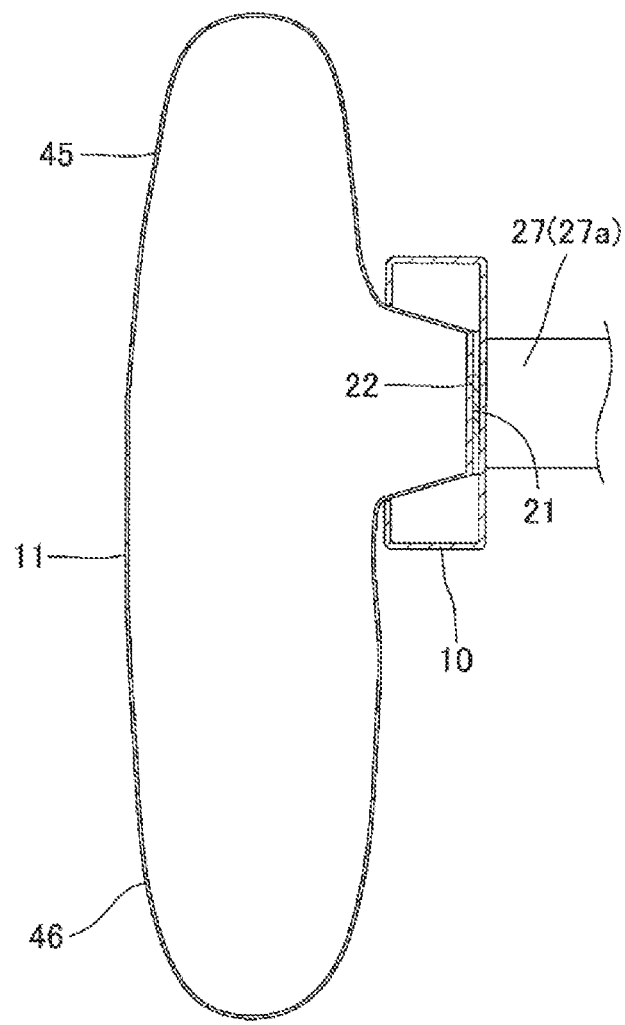
FIG. 20 is a cross sectional view showing a state in which the first air bag held by the first holding part inflates so as to protrude long in a vertical direction at the same time as inflating so as to protrude outward as seen in a horizontal plane.

(9) The first airbag 11 may be structured, for example, as shown in FIG. 20, such as to be inflated so as to protrude long upward and/or downward as well as being inflated so as to protrude outward as seen in the horizontal plane by the supplied gas. In FIG. 20, there is shown a state of being inflated so as to protrude long upward and downward. In the case of being inflated so as to protrude long upward and downward as mentioned above, the upper and lower protruding portions 45 and 46 can more effectively achieve the buffer action in a vertical direction, and it is possible to more effectively achieve the prevention of the danger in the case that the drone 9 collides with the person, by means of the upper and lower protruding portions 45 and 46. Particularly, in the case of being inflated so as to protrude long downward, the drone 9 tends to be crashed in a state in which the lower surface part thereof is directed downward in the normal case. As a result, it is possible to more effectively achieve the prevention of the danger and this structure is accordingly preferable.

Figure 21:
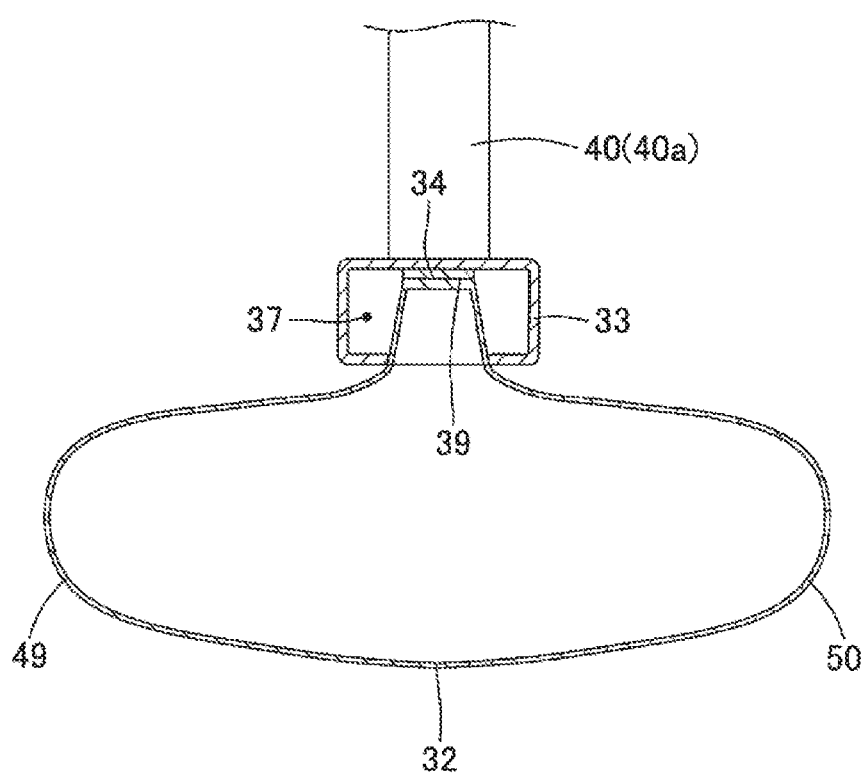
FIG. 21 is a cross sectional view showing a state in which the second airbag held by the second holding part inflates so as to protrude long to one side and the other side as seen in a surface which is orthogonal to the vertical plane, at the same time as inflating so as to protrude outward as seen in the vertical plane.

(10) The second airbag 32 may be structured, for example, as shown in FIG. 21, such as to be inflated so as to protrude long to one side and/or the other side as seen in a surface which is orthogonal to the vertical plane, as well as being inflated so as to protrude outward as seen in the vertical plane, by the supplied gas. In FIG. 21, there is shown a state of being inflated so as to protrude long toward the one side and the other side. Since an expanding area of the second airbag 32 in the orthogonal surface is increased by reverse protruding parts 49 and 50, it is possible to effectively prevent the danger that the drone 9 injures the person in the case that the drone collides with the other things such as the person.

Figure 22:
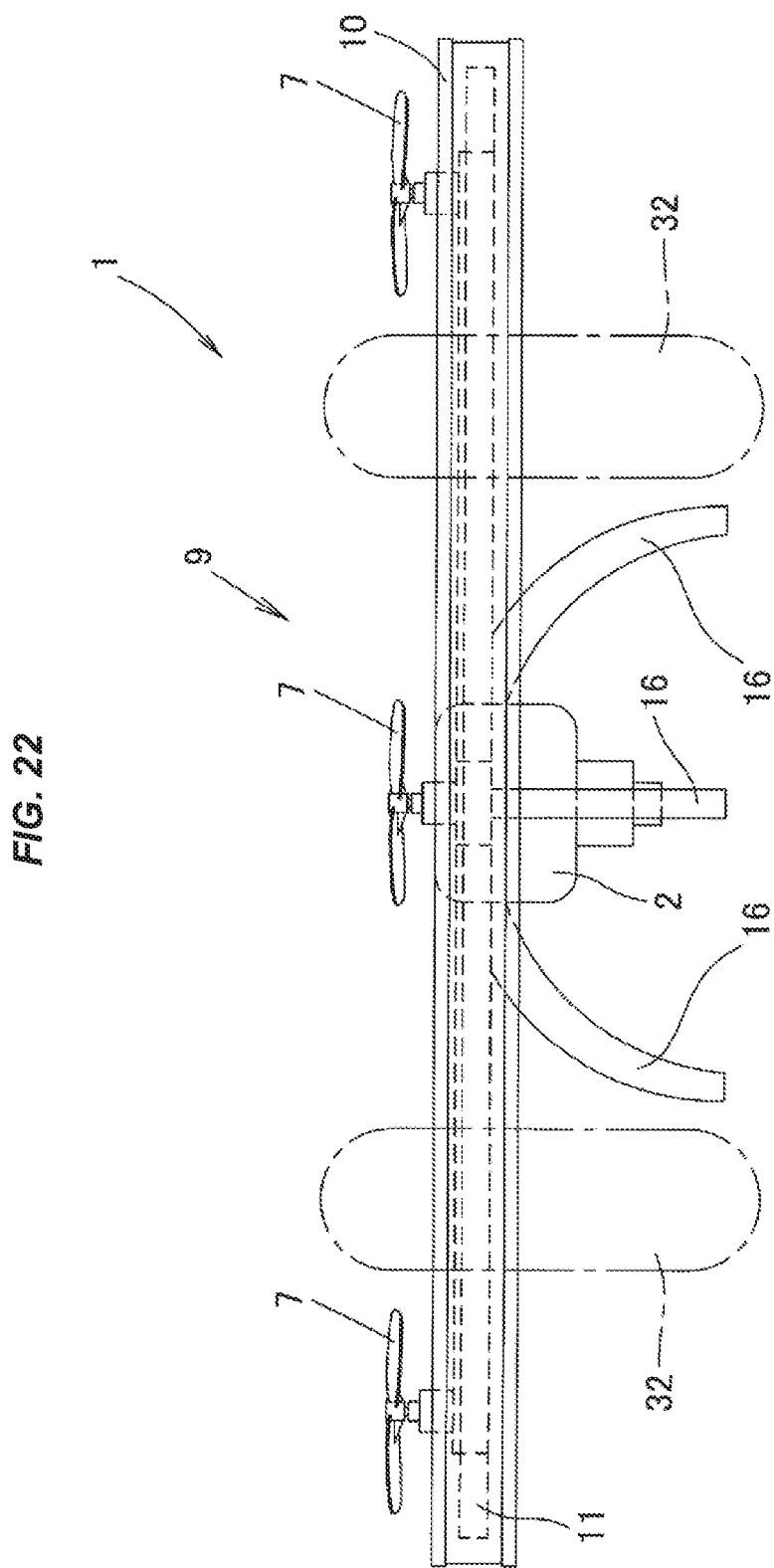
FIG. 22 is a front elevational view showing a drone with an airbag in which the inflating second airbags are provided in such a manner as to form a vertical parallel state.

(11) In the case that the drone 9 is provided with the second airbag 32 and is also provided with the second inflation control device which controls the inflation of the second airbag 32, the second airbags 32 and 32 may be provided in such a manner as to form a parallel state in their inflated state of surrounding the arm parts 3 and 3 in the vertical plane in the right and left sides of the central mounting part 2, for example, as shown by a one-dot chain line in FIG. 22. Further, as shown by a one-dot chain line in FIGS. 23 and 24, the second airbags 32 and 32 may be provided in such a manner as to form an inverted v-shaped form (FIG. 23) or a v-shaped form (FIG. 24) in a front elevational view in their inflated state of surrounding the arm parts 3 and 3 in the surface which is inclined to the vertical plane in the right and left sides of the central mounting part 2. Alternatively, as shown by a one-dot chain line in FIG. 25, the air bags may be structured such that two second air bags 32 are provided, two second airbags 32 and 32 in the inflated state are provided in such a manner as to pinch the central mounting part 2 in a crossing state, and each of the second airbags 32 and 32 is held by the second holding part 33 which is substantially provided in the central mounting part 2.

Figure 23:
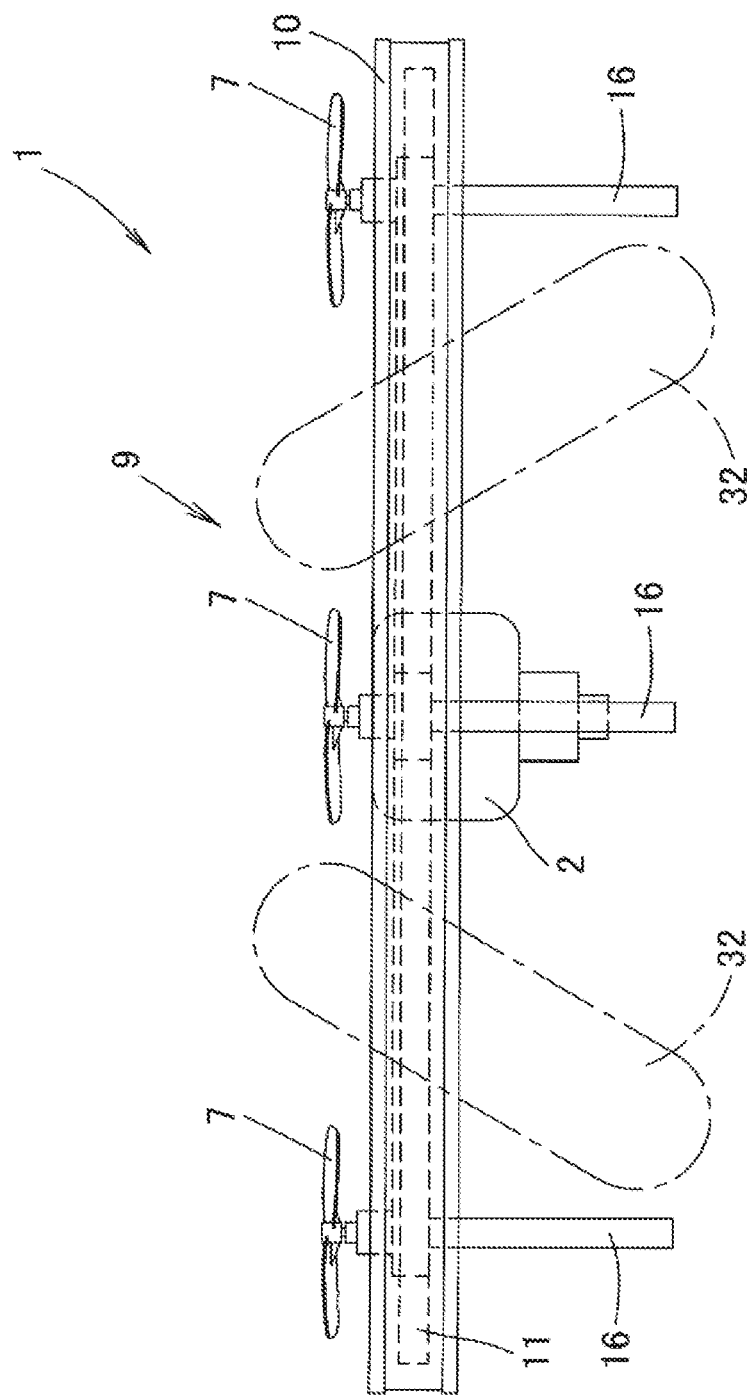
FIG. 23 is a front elevational view showing a drone with an airbag in which the inflating second airbags are provided in such a manner as to form an inverted v-shaped form in a front elevational view, in right and left sides of the central mounting part.
Figure 24:
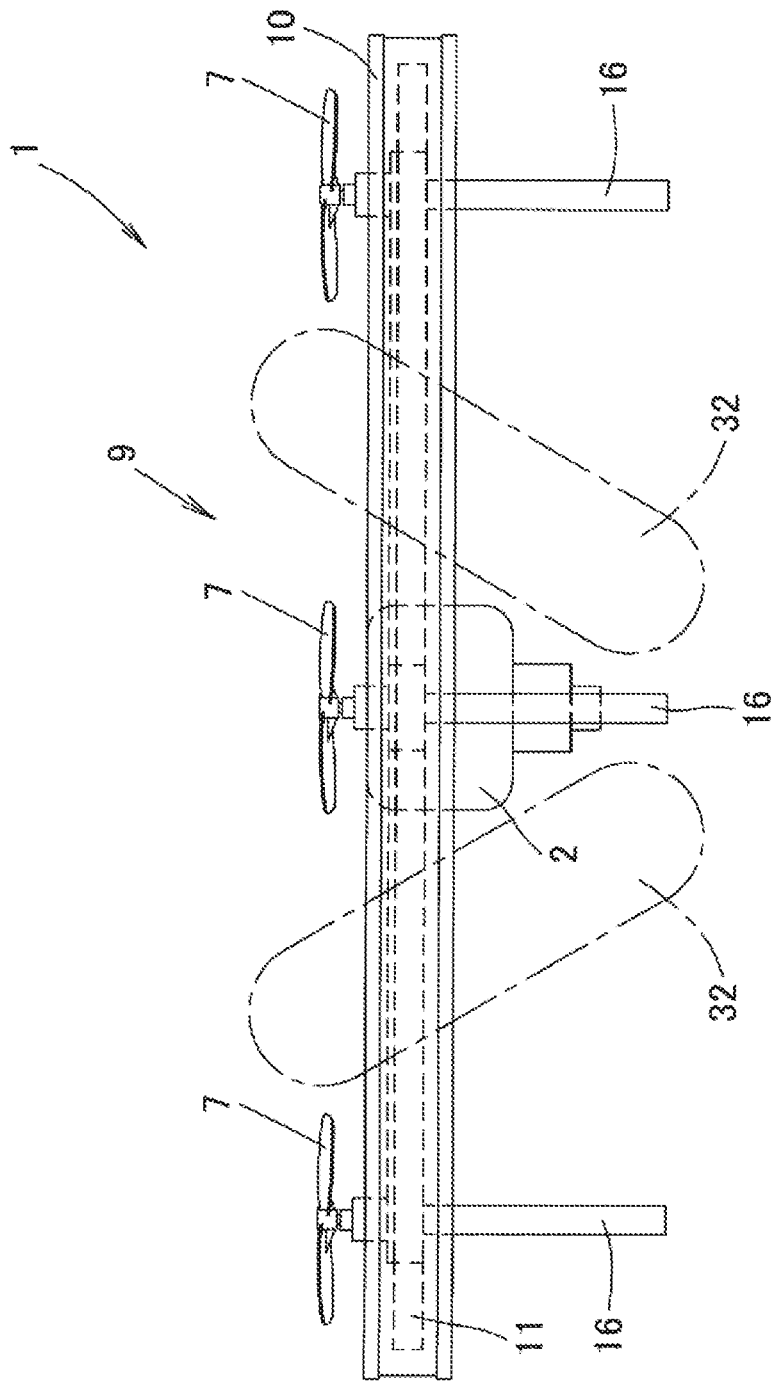
FIG. 24 is a front elevational view showing a drone with an airbag in which the inflating second airbags are provided in such a manner as to form a v-shaped form, in the right and left sides of the central mounting part.
Figure 25:
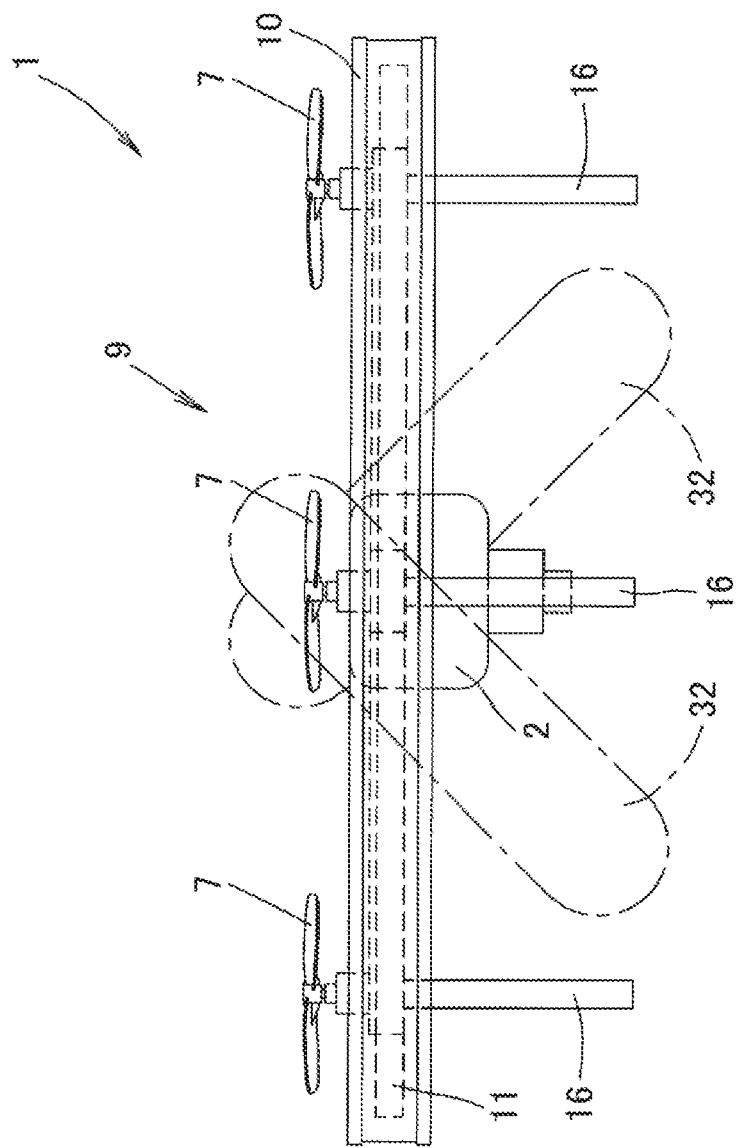
FIG. 25 is a front elevational view showing a drone with an airbag in which two of the inflating second airbags are provided in such a manner as to pinch the central mounting part in a crossing state.

In these cases, the second airbag 32 is initially in the folded state in the same manner as shown in FIG. 11. The second inflation control device of the drone 9 automatically detects the uncontrollable state of the drone 9, and the gas is supplied to the second airbag 2 on the basis of the control by the second inflation control device, whereby the second airbag 32 can be inflated so as to protrude toward an external direction. In FIGS. 23 to 25, the leg part 16 is provided downward at the front side position of the arm part 3.

Figure 26:
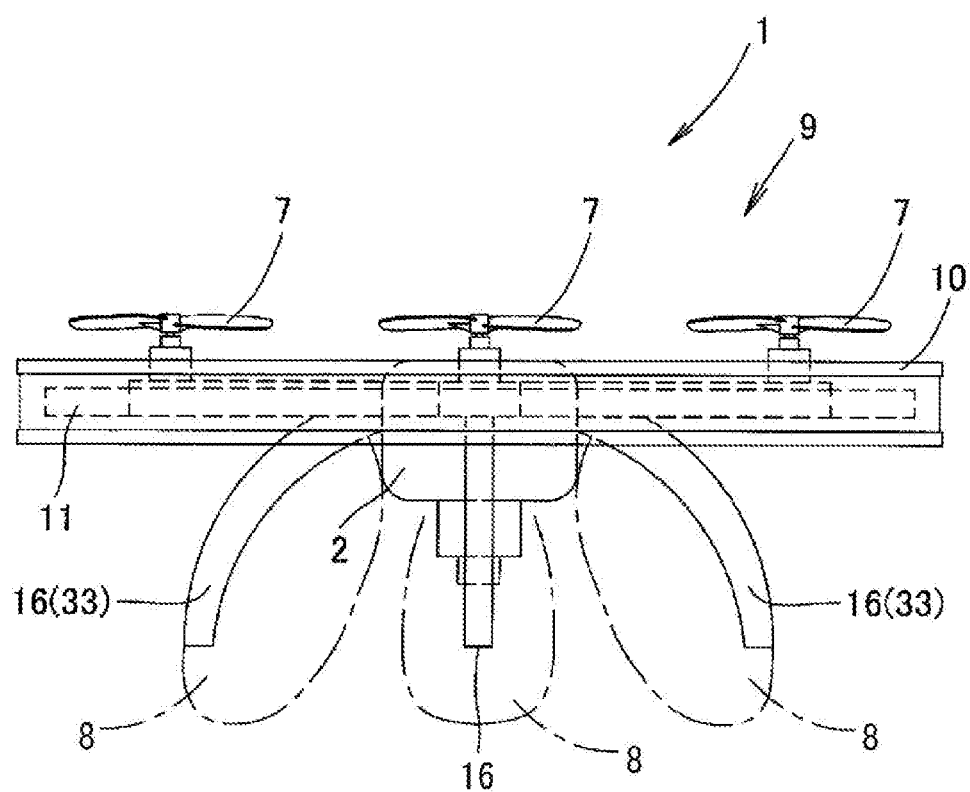
FIG. 26 is a front elevational view showing a drone with an airbag in which the second airbags are embedded in a leg part.

(12) The airbag 8 can be structured, for example, as shown in FIG. 26, such that the airbag 8 is attached in the folded state to the leg part 16. In addition, the airbag 8 may be structured such that the airbag 8 is attached in the folded state to the first support part 27 (FIG. 1, FIG. 7, FIGS. 13 to 14, and FIGS. 15 to 17).

(13) As the means for inflating the first airbag 11 and the second airbag 32 in the folded state, it is possible to employ a means for inflating by using a simplified gas cylinder and a means for inflating by using an air feeding means constructed by a pump utilizing a motor, in addition to the means for inflating by using the inflator mentioned above.

(14) The amount of protrusion of the first airbag 11 and the second airbag 32 when they are inflated can be appropriately set according to the shape and the size of the drone in such a manner as to effectively prevent the danger that the drone 1 injures the person in the case that the drone 1 collides with the other things such as the person. It may be set to a magnitude, for example, about 100 to 200 mm, and further to a greater magnitude.

(15) The first airbag 11 and the second airbag 32 may be partly different in their amounts of protrusion toward the external sixe as seen in their peripheral directions. The state of change in the amount of protrusion can be appropriately set according to the shape and the size of the drone in such a manner as to effectively prevent the danger that the drone 1 injures the person in the case that the drone 1 collides with the other things such as the person.

(16) The drones with airbags 1 shown in FIGS. 13 to 19 can be all structured such as to be provided with both the first airbag 11 and the second airbag 32. The drones with airbags 1 shown in FIGS. 22 to 26 are all structured such as to be provided with both the first airbag 11 and the second airbag 32.

(17) The first airbag 11 is not specified to the structure which surrounds the drone 9 in the horizontal plane while putting the central mounting part 12 at the center as shown by the embodiments, as long as the first airbag 11 surrounds the drone 9 in the horizontal plate in the inflated state. For example, it may be provided in such a manner as to surround the drone 9 while being put to the lower side or the upper side of the central mounting part 2.

(18) In the embodiments mentioned above, the first inflation control device and the second inflation control device are individually provided in correspondence to the first airbag 11 and the second airbag 32, however, it is possible to structure such that one inflation control device simultaneously controls the inflation of the first airbag 11 and the second airbag 32. In this case, the first inflation control device and the second inflation control device are the same device.

(19) The inflation control device (including the first inflation control device and the second inflation control device) can be provided in the other positions than the central mounting part 2, for example, being provided in the first holding part 10 or the second holding part 33, in addition to being provided in the central mounting part 2 as mentioned above.

(20) In the present invention, the central mounting part 2 may be constructed as an assembly of a plurality of divided parts.

Figure 27:
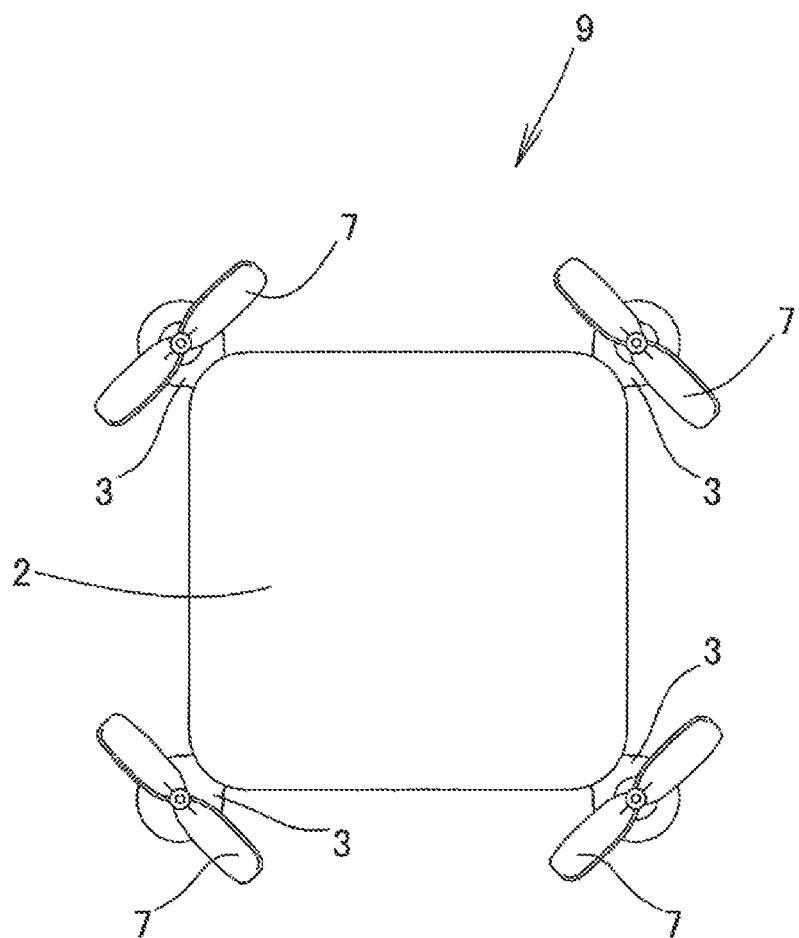
FIG. 27 is a plan view showing a drone in which the arm part is formed comparatively short.

(21) The present invention can be constructed by using the drones 9 having the various shapes and magnitudes. Further, the arm part 3 is not limited to protrude comparatively long from the central mounting part 2, but may be structured such as to protrude short, for example, as shown in FIG. 27. In this case, the first airbag 11 and the second airbag 32 are also provided in the same manner as mentioned above.

(22) In a state in which the first airbag 11 is accommodated in the accommodation part 20 of the first holding part 10, or in a state in which the second airbag 32 is accommodated in the accommodation part 37 of the second holding part 33, open end parts of these accommodation parts 20 and 37 may be covered with an appropriate cover member. In this case, the cover member opens effortlessly when the first airbag 11 and the second airbag 32 are inflated.

The invention claimed is:

1. A drone with an airbag, wherein the drone provided with a rotary vane generating a lift force is provided with a first airbag which absorbs a shock generated when the drone is crashed and collides with other things, and is provided with a first inflation control device which controls inflation of the first airbag, the drone is provided with an arm part which is protruded from a central mounting part in a radial pattern, or one arm part or a plurality of arm parts which are protruded in each of right and left sides of the central mounting part, and the rotary vane generating the lift force by rotation thereof is provided at a front side position of the arm part, wherein the first airbag is held by a first holding part which is substantially provided in the central mounting part, wherein the first holding part holds the first airbag in a folded state from which the first airbag can inflate by gas supplied by the control of the first inflation control device, the inflating first airbag is adapted to inflate so as to protrude outward from the first holding part as seen in the horizontal plane, the inflation is carried out by the control before the drone collides with other things, and the inflating first airbag surrounds the drone in a horizontal plane while putting the central mounting part in the center, wherein the drone with the airbag is additionally provided with a second airbag which absorbs the shock when the drone is crashed and collides with other things, and is provided with a second inflation control device which controls inflation of the second airbag, the second airbag is constructed by two second airbags, these two second airbags can inflate in such a manner as to pinch the central mounting part in a crossing state, and each of the second airbags is held by a second holding part which is substantially provided in the central mounting part, and wherein the second holding part is provided in a folded state with the second airbag which can inflate by the gas supplied by the control of the second inflation control device, the inflating second airbag is adapted to pinch the central mounting part in the crossing state, the inflation is carried out by the control before the drone collides with other things, and the inflating second airbag pinches the central mounting part in the crossing state.

2. The drone with the airbag according to claim 1, wherein the first airbag is adapted to inflate so as to protrude upward and/or downward at the same time as inflating so as to protrude outward as seen in the horizontal plane by the supply of the gas.

3. The drone with the air bag according to claim 1, wherein the first holding part is connected to a front end part of a first support part which is protruded in the central mounting part, and the first holding part is thereby provided substantially in the central mounting part.

4. A drone with at least one airbag, wherein the drone provided with a rotary vane generating a lift force is provided with a first airbag which absorbs a shock generated when the drone is crashed and collides with other things, and is provided with a first inflation control device which controls inflation of the first airbag, wherein the first airbag, when not inflated, is folded into a first holder that surrounds the drone in a first plane, the first holder including a radially-outward facing opening that extends around the holder, and through which the airbag is extended in the first plane to form an annular cushion around the drone when the airbag is inflated by gas provided by control of first inflation control device.

5. A drone with an airbag as claimed in claim 4, further comprising a second airbag and a second annular holder that surrounds the drone in a second plane perpendicular to the first plane, wherein the second airbag, when not inflated, is folded into the second holder, and wherein the second holder includes a second radially-outward facing opening that extends around the second holder, and through which the second airbag is extended to form a cushion around the drone in the second plane when the airbag is inflated by gas provided by control of a second inflation control device.

* * * * *